US012160820B2

United States Patent
Dimou et al.

(10) Patent No.: US 12,160,820 B2
(45) Date of Patent: Dec. 3, 2024

(54) NETWORK ENTITY BACKOFF POWER ADAPTATION FOR WIRELESS COMMUNICATIONS

(71) Applicant: QUALCOMM Incorporated, San Diego, CA (US)

(72) Inventors: Konstantinos Dimou, New York City, NY (US); Igor Gutman, Hod HaSharon (IL); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 346 days.

(21) Appl. No.: 17/882,715

(22) Filed: Aug. 8, 2022

(65) Prior Publication Data

US 2024/0049131 A1 Feb. 8, 2024

(51) Int. Cl.
*H04B 17/20* (2015.01)
*H04B 17/336* (2015.01)
(Continued)

(52) U.S. Cl.
CPC ...... *H04W 52/0212* (2013.01); *H04B 17/254* (2023.05); *H04B 17/336* (2015.01); *H04B 17/345* (2015.01); *H04B 17/354* (2015.01); *H04W 24/08* (2013.01); *H04W 24/10* (2013.01); *H04W 52/0206* (2013.01);
(Continued)

(58) Field of Classification Search
CPC ............ H04B 17/0082–409; H04W 24/02–10; H04W 52/02–60; H04W 72/02–569; H04W 84/005–22; H04W 88/005–188; H04W 92/02–24; Y02D 30/70
See application file for complete search history.

(56) References Cited

U.S. PATENT DOCUMENTS

2010/0099449 A1* 4/2010 Borran ............... H04W 52/243
2011/0081865 A1* 4/2011 Xiao .................. H04W 52/243

FOREIGN PATENT DOCUMENTS

EP 2592769 A1 5/2013
WO WO-2020146851 A1 7/2020

OTHER PUBLICATIONS

International Search Report and Written Opinion—PCT/US2023/026909—ISA/EPO—Oct. 6, 2023.

* cited by examiner

*Primary Examiner* — Timothy J Weidner
(74) *Attorney, Agent, or Firm* — Holland & Hart LLP

(57) ABSTRACT

Methods, systems, and devices for wireless communication are described. In some systems, a network entity may adjust a backoff power level for communications by the network entity in a first cell supported by the network entity. The network entity may transmit signaling that indicates an estimated level of interference in a second cell supported by a neighboring network entity based on the adjusted backoff power level. The network entity may receive a feedback message from the neighboring network entity that indicates downlink interference measurements by one or more UEs operating within the second cell. In some examples, the feedback message may indicate a difference in interference measurements obtained by the UEs before and after the backoff power level is adjusted by the network entity. The network entity may further adjust or maintain the backoff power level based on the feedback received from the neighboring network entity.

30 Claims, 18 Drawing Sheets

(51) Int. Cl.
*H04B 17/345* (2015.01)
*H04B 17/354* (2015.01)
*H04W 24/08* (2009.01)
*H04W 24/10* (2009.01)
*H04W 52/02* (2009.01)
*H04W 52/14* (2009.01)
*H04W 52/24* (2009.01)
*H04W 52/38* (2009.01)
*H04W 52/42* (2009.01)
*H04W 72/12* (2023.01)
*H04W 72/541* (2023.01)
*H04W 84/02* (2009.01)
*H04W 88/02* (2009.01)
*H04W 88/08* (2009.01)
*H04W 92/02* (2009.01)
*H04W 92/10* (2009.01)
*H04W 92/20* (2009.01)

(52) U.S. Cl.
CPC ... *H04W 52/0229* (2013.01); *H04W 52/0238* (2013.01); *H04W 52/143* (2013.01); *H04W 52/243* (2013.01); *H04W 52/386* (2013.01); *H04W 52/42* (2013.01); *H04W 72/12* (2013.01); *H04W 72/541* (2023.01); *H04W 84/02* (2013.01); *H04W 88/02* (2013.01); *H04W 88/08* (2013.01); *H04W 92/02* (2013.01); *H04W 92/10* (2013.01); *H04W 92/20* (2013.01); *Y02D 30/70* (2020.08)

NETWORK ENTITY BACKOFF POWER ADAPTATION FOR WIRELESS COMMUNICATIONS

FIELD OF TECHNOLOGY

The following relates to wireless communication, including network entity backoff power adaptation for wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communication systems, one or more wireless devices may apply power backoff to non-linear transmission components within the devices. The applied power backoff may reduce non-linear distortions associated with transmissions by the devices.

SUMMARY

The described techniques relate to improved methods, systems, devices, and apparatuses that support network entity backoff power adaptation for wireless communications. For example, the described techniques provide for a first network entity to adjust a backoff power level for communications by the network entity in a first cell of the first network entity. To facilitate the backoff power level adjustment, the first network entity may transmit signaling that indicates an estimated level of interference that may be experienced by wireless devices communicating in a second cell supported by a second (e.g., neighboring) network entity based on the adjusted backoff power level. The first network entity may receive a feedback message from the neighboring network entity based on the adjusted power backoff level. The feedback message may indicate downlink interference measurements by one or more UEs operating within the second cell of the second network entity. In some examples, the feedback message may indicate a difference between a first set of interference measurements obtained by the one or more UEs at a first time that is before the backoff power level is adjusted by the first network entity and a second set of interference measurements obtained by the one or more UEs at a second time that is after the backoff power level is adjusted by the first network entity.

The first network entity may determine whether to further adjust (e.g., increase or decrease) the backoff power level or to maintain the adjusted backoff power level based on the feedback received from the neighboring network entity. By adjusting power backoff based on feedback from wireless devices in neighboring cells, the first network entity may reduce power consumption and refrain from interfering with wireless communications in the neighboring cells, which may improve communication reliability.

A method for wireless communication at a first network entity is described. The method may include adjusting a backoff power level for communications by the first network entity in a first cell, transmitting signaling that indicates an estimated level of interference in a second cell supported by a second network entity, the estimated level of interference based on the adjusted backoff power level for the communications by the first network entity in the first cell, and receiving, based on the estimated level of interference, a feedback message that indicates downlink interference measurements by at least one user equipment (UE) of a set of UEs in the second cell, where the downlink interference measurements are based on the adjusted backoff power level.

An apparatus for wireless communication at a first network entity is described. The apparatus may include a processor, memory coupled with the processor, and instructions stored in the memory. The instructions may be executable by the processor to cause the apparatus to adjust a backoff power level for communications by the first network entity in a first cell, transmit signaling that indicates an estimated level of interference in a second cell supported by a second network entity, the estimated level of interference based on the adjusted backoff power level for the communications by the first network entity in the first cell, and receive, based on the estimated level of interference, a feedback message that indicates downlink interference measurements by at least one UE of a set of UEs in the second cell, where the downlink interference measurements are based on the adjusted backoff power level.

Another apparatus for wireless communication at a first network entity is described. The apparatus may include means for adjusting a backoff power level for communications by the first network entity in a first cell, means for transmitting signaling that indicates an estimated level of interference in a second cell supported by a second network entity, the estimated level of interference based on the adjusted backoff power level for the communications by the first network entity in the first cell, and means for receiving, based on the estimated level of interference, a feedback message that indicates downlink interference measurements by at least one UE of a set of UEs in the second cell, where the downlink interference measurements are based on the adjusted backoff power level.

A non-transitory computer-readable medium storing code for wireless communication at a first network entity is described. The code may include instructions executable by a processor to adjust a backoff power level for communications by the first network entity in a first cell, transmit signaling that indicates an estimated level of interference in a second cell supported by a second network entity, the estimated level of interference based on the adjusted backoff power level for the communications by the first network entity in the first cell, and receive, based on the estimated level of interference, a feedback message that indicates downlink interference measurements by at least one UE of a set of UEs in the second cell, where the downlink interference measurements are based on the adjusted backoff power level.

Some examples of the method, apparatuses, and non-transitory computer-readable medium described herein may further include operations, features, means, or instructions for adapting, based on the downlink interference measurements indicated via the feedback message, the backoff power level for the communications in the first cell.

In some examples of the method, apparatuses, and non-transitory computer-readable medium described herein, adapting the backoff power level may include operations, features, means, or instructions for increasing or decreasing the adjusted backoff power level based on the backoff adaptation command.

In some examples of the method, apparatuses, and non-transitory computer-readable medium described herein, receiving the feedback message may include operations, features, means, or instructions for receiving, via the feedback message, a difference between a first set of downlink interference measurements obtained by the at least one UE before the backoff power level may be adjusted and a second set of downlink interference measurements by the at least one UE after the backoff power level may be adjusted, where adapting the backoff power level may be based on the difference being greater than a threshold.

In some examples of the method, apparatuses, and non-transitory computer-readable medium described herein, the downlink interference measurements may be associated with a second frequency band, the second frequency band associated with communications via the second cell and the feedback message further indicates additional downlink interference measurements by the at least one UE of the set of UEs in a third frequency band adjacent to the second frequency band, the adapting the backoff power level based on the additional downlink interference measurements.

Some examples of the method, apparatuses, and non-transitory computer-readable medium described herein may further include operations, features, means, or instructions for receiving a resource status response message that initiates a backoff adaptation procedure, where adjusting the backoff power level may be based on the received resource status response message.

In some examples of the method, apparatuses, and non-transitory computer-readable medium described herein, the resource status response message indicates that a quantity of resources used for communications in the second cell may be less than a threshold quantity.

Some examples of the method, apparatuses, and non-transitory computer-readable medium described herein may further include operations, features, means, or instructions for transmitting a resource status request message to initiate the backoff adaptation procedure, where receiving the resource status response message may be based on the resource status request message.

Some examples of the method, apparatuses, and non-transitory computer-readable medium described herein may further include operations, features, means, or instructions for comparing a first quantity of resources used for the communications in the first cell, a second quantity of resources used for second communications in the second cell, or both with a threshold quantity, where adjusting the backoff power level may be based on one or both of the first quantity or the second quantity being less than the threshold quantity.

In some examples of the method, apparatuses, and non-transitory computer-readable medium described herein, the first quantity and the second quantity correspond to a quantity of physical resource blocks, a quantity of downlink control channel elements, or both, the first quantity and the second quantity include resources associated with a respective cell, resources associated with a synchronization signal block area, resources associated with a network slice, resources associated with multiple-input multiple-output communications, resources associated with guaranteed bit rate communications, or any combination thereof, and the threshold quantity may be based on a type of resource usage.

Some examples of the method, apparatuses, and non-transitory computer-readable medium described herein may further include operations, features, means, or instructions for determining, based on an interference estimation procedure, a set of multiple estimated levels of interference in the second cell, each estimated level of interference associated with a respective backoff power level of a set of multiple backoff power levels at the first network entity and selecting the estimated level of interference from the set of multiple estimated levels of interference based on the adjusted backoff power level.

In some examples of the method, apparatuses, and non-transitory computer-readable medium described herein, transmitting the signaling may include operations, features, means, or instructions for transmitting, via the signaling, an indication of a first time at which the adjusted backoff power level and the estimated level of interference associated with the adjusted backoff power level will be applied.

Some examples of the method, apparatuses, and non-transitory computer-readable medium described herein may further include operations, features, means, or instructions for transmitting, based on the adjusted backoff power level and the estimated level of interference, a request for the second network entity to increase a frequency band margin between a first frequency band associated with the communications via the first cell and a second frequency band associated with second communications via the second cell.

In some examples of the method, apparatuses, and non-transitory computer-readable medium described herein, the first cell may be associated with a first frequency band, the second cell may be associated with a second frequency band, and the estimated level of interference corresponds to an estimated adjacent channel leakage ratio in the second frequency band based on the communications in the first frequency band.

A method for wireless communication at a second network entity is described. The method may include receiving signaling that indicates an estimated level of interference in a cell supported by the second network entity, the estimated level of interference based on an adjusted backoff power level at a first network entity, receiving at least one interference report that indicates downlink interference measurements by a UE of a set of UEs in the cell, and transmitting, based on the estimated level of interference and the at least one interference report, a feedback message that indicates the downlink interference measurements, where the downlink interference measurements are based on the adjusted backoff power level.

An apparatus for wireless communication at a second network entity is described. The apparatus may include a processor, memory coupled with the processor, and instructions stored in the memory. The instructions may be executable by the processor to cause the apparatus to receive signaling that indicates an estimated level of interference in a cell supported by the second network entity, the estimated level of interference based on an adjusted backoff power level at a first network entity, receive at least one interference report that indicates downlink interference measurements by a UE of a set of UEs in the cell, and transmit, based on the estimated level of interference and the at least one interference report, a feedback message that indicates the downlink interference measurements, where the downlink interference measurements are based on the adjusted backoff power level.

Another apparatus for wireless communication at a second network entity is described. The apparatus may include means for receiving signaling that indicates an estimated level of interference in a cell supported by the second network entity, the estimated level of interference based on an adjusted backoff power level at a first network entity, means for receiving at least one interference report that indicates downlink interference measurements by a UE of a set of UEs in the cell, and means for transmitting, based on the estimated level of interference and the at least one interference report, a feedback message that indicates the downlink interference measurements, where the downlink interference measurements are based on the adjusted backoff power level.

A non-transitory computer-readable medium storing code for wireless communication at a second network entity is described. The code may include instructions executable by a processor to receive signaling that indicates an estimated level of interference in a cell supported by the second network entity, the estimated level of interference based on an adjusted backoff power level at a first network entity, receive at least one interference report that indicates downlink interference measurements by a UE of a set of UEs in the cell, and transmit, based on the estimated level of interference and the at least one interference report, a feedback message that indicates the downlink interference measurements, where the downlink interference measurements are based on the adjusted backoff power level.

In some examples of the method, apparatuses, and non-transitory computer-readable medium described herein, transmitting the feedback message may include operations, features, means, or instructions for transmitting, via the feedback message, a difference between a first set of downlink interference measurements obtained by the UE before a backoff power level may be adjusted at the first network entity and a second set of downlink interference measurements obtained by the UE after the backoff power level may be adjusted at the first network entity.

In some examples of the method, apparatuses, and non-transitory computer-readable medium described herein, transmitting the feedback message may include operations, features, means, or instructions for transmitting, via the feedback message, a backoff adaptation command that instructs the first network entity to increase or decrease the adjusted backoff power level based on the downlink interference measurements from the UE.

Some examples of the method, apparatuses, and non-transitory computer-readable medium described herein may further include operations, features, means, or instructions for determining a quantity of resources used for communications in the cell may be less than a threshold quantity and transmitting a resource status response message that indicates the quantity of resources used for communications in the cell may be less than the threshold quantity, where receiving the signaling that indicates the estimated level of interference may be based on the resource status response message.

Some examples of the method, apparatuses, and non-transitory computer-readable medium described herein may further include operations, features, means, or instructions for receiving a resource status request message that initiates a backoff adaptation procedure, where transmitting the resource status response message may be based on the resource status request message.

In some examples of the method, apparatuses, and non-transitory computer-readable medium described herein, the quantity of resources corresponds to a quantity of physical resource blocks, a quantity of downlink control channel elements, or both and the quantity of resources includes resources used within the cell, resources used within a synchronization signal block area, resources used within a network slice, resources used for multiple-input multiple-output communications, resources used for guaranteed bit rate communications, or any combination thereof.

In some examples of the method, apparatuses, and non-transitory computer-readable medium described herein, receiving the signaling may include operations, features, means, or instructions for receiving, via the signaling, an indication of a first time at which the adjusted backoff power level and the estimated level of interference associated with the adjusted backoff power level will be applied.

Some examples of the method, apparatuses, and non-transitory computer-readable medium described herein may further include operations, features, means, or instructions for receiving a request to increase a frequency band margin between a first frequency band associated with first communications via a first cell supported by the first network entity and a second frequency band associated with second communications via the cell supported by the second network entity and scheduling the second communications within the second frequency band at least a threshold margin from the first frequency band based on the request.

Some examples of the method, apparatuses, and non-transitory computer-readable medium described herein may further include operations, features, means, or instructions for transmitting a control message that indicates a backoff report configuration for reporting changes in the downlink interference measurements at the UE based on a backoff power level adjustment at the first network entity, the control message indicating a time instance at which the adjusted backoff power level will be applied, where, the at least one interference report indicates a difference between a first level of downlink interference measured by the UE prior to the time instance and a second level of downlink interference measured by the UE after the time instance, and transmitting the feedback message may be based on the difference.

A method for wireless communication at a UE is described. The method may include measuring a first level of downlink interference at the UE, the downlink interference associated with communications by the UE in a second cell, receiving a control message that indicates a backoff report configuration for reporting changes in the downlink interference at the UE based on an adjustment of a backoff power level for communications in a first cell, and transmitting, based on the backoff report configuration, an interference report that indicates a second level of the downlink interference measured at the UE for at least a time period, the second level greater than the first level by at least a threshold, where the downlink interference increasing to the second level for the time period is based on the adjustment of the backoff power level in the first cell.

An apparatus for wireless communication at a UE is described. The apparatus may include a processor, memory coupled with the processor, and instructions stored in the memory. The instructions may be executable by the processor to cause the apparatus to measure a first level of downlink interference at the UE, the downlink interference associated with communications by the UE in a second cell, receive a control message that indicates a backoff report configuration for reporting changes in the downlink interference at the UE based on an adjustment of a backoff power level for communications in a first cell, and transmit, based on the backoff report configuration, an interference report that indicates a second level of the downlink interference measured at the UE for at least a time period, the second level greater than the first level by at least a threshold, where the downlink interference increasing to the second level for the time period is based on the adjustment of the backoff power level in the first cell.

Another apparatus for wireless communication at a UE is described. The apparatus may include means for measuring a first level of downlink interference at the UE, the downlink interference associated with communications by the UE in a second cell, means for receiving a control message that indicates a backoff report configuration for reporting changes in the downlink interference at the UE based on an adjustment of a backoff power level for communications in a first cell, and means for transmitting, based on the backoff report configuration, an interference report that indicates a second level of the downlink interference measured at the UE for at least a time period, the second level greater than the first level by at least a threshold, where the downlink interference increasing to the second level for the time period is based on the adjustment of the backoff power level in the first cell.

A non-transitory computer-readable medium storing code for wireless communication at a UE is described. The code may include instructions executable by a processor to measure a first level of downlink interference at the UE, the downlink interference associated with communications by the UE in a second cell, receive a control message that indicates a backoff report configuration for reporting changes in the downlink interference at the UE based on an adjustment of a backoff power level for communications in a first cell, and transmit, based on the backoff report configuration, an interference report that indicates a second level of the downlink interference measured at the UE for at least a time period, the second level greater than the first level by at least a threshold, where the downlink interference increasing to the second level for the time period is based on the adjustment of the backoff power level in the first cell.

Some examples of the method, apparatuses, and non-transitory computer-readable medium described herein may further include operations, features, means, or instructions for determining a difference between the second level of the downlink interference and the first level of the downlink interference, where the interference report indicates the difference.

Some examples of the method, apparatuses, and non-transitory computer-readable medium described herein may further include operations, features, means, or instructions for comparing the difference with the threshold, where the interference report indicates that the difference may be greater than the threshold.

Some examples of the method, apparatuses, and non-transitory computer-readable medium described herein may further include operations, features, means, or instructions for receiving, prior to a time instance associated with the adjustment of the backoff power level in the first cell, a first set of multiple channel state information reference signals, where measuring the first level of the downlink interference may be based on the first set of multiple channel state information reference signals, receiving, after the time instance, a second set of multiple channel state information reference signals, where the control message indicates the time instance, and measuring the second level of the downlink interference based on the second set of multiple channel state information reference signals.

In some examples of the method, apparatuses, and non-transitory computer-readable medium described herein, receiving the control message may include operations, features, means, or instructions for receiving, via the control message, an indication of the threshold, the time period, and a time instance at which an adjusted backoff power level in the first cell will be applied.

DETAILED DESCRIPTION

Figure 1:
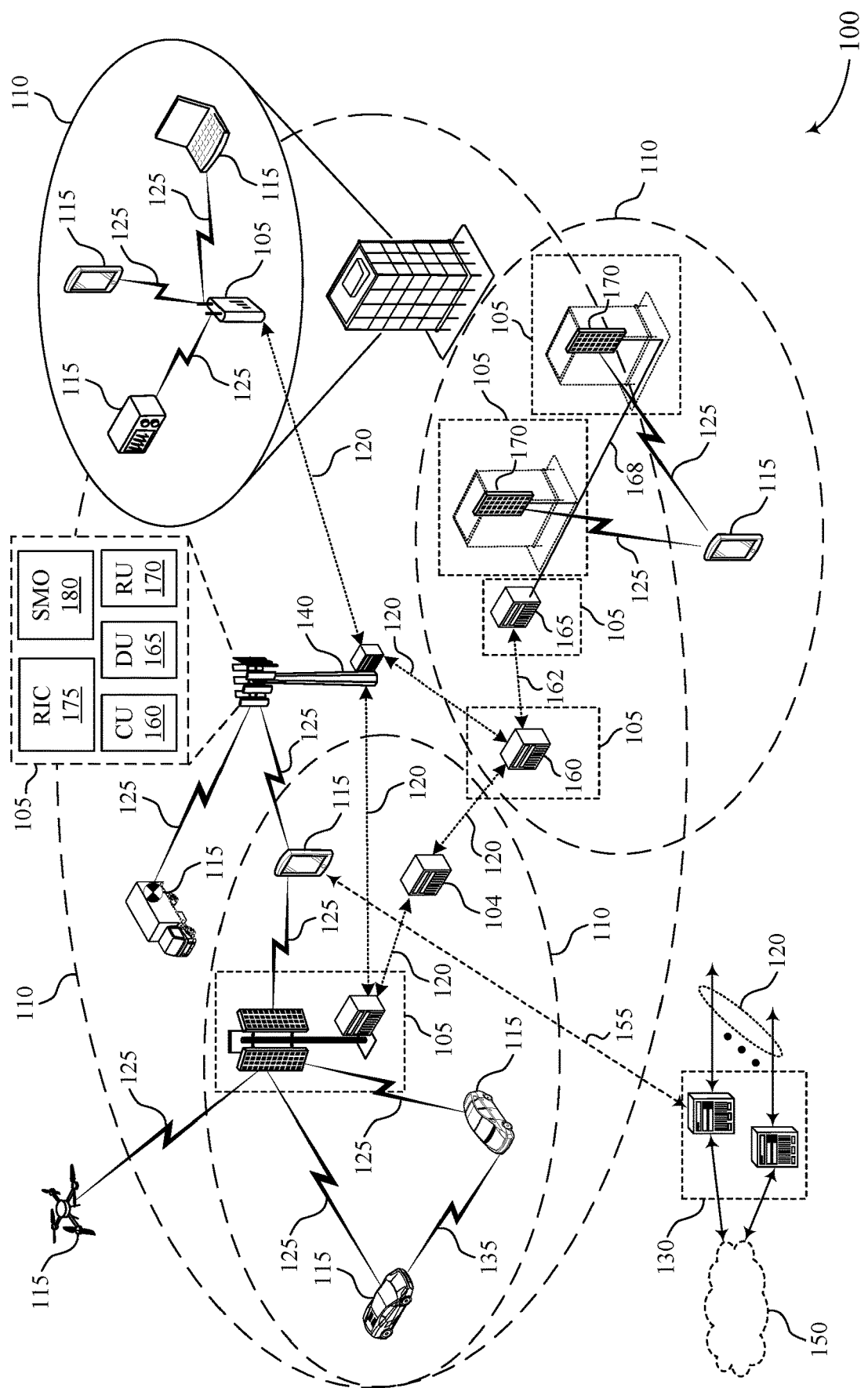
FIG. 1 illustrates an example of a wireless communications system that supports network entity backoff power adaptation for wireless communications in accordance with one or more aspects of the present disclosure.

In some wireless communications systems, one or more wireless devices (e.g., a network entity, a user equipment (UE), or some other wireless device) may include one or more non-linear transmission components, such as power amplifiers. Transmissions by such wireless devices may include non-linear distortions, in some aspects, based on the non-linear transmission components. The non-linear distortions may include adjacent channel interference (ACI), which may correspond to an amount of pollution or interference in one or more adjacent channels or frequency bands due to a first transmission by the wireless device in a first channel or frequency band (e.g., a main transmission). In some aspects, the ACI may be measured in terms of an adjacent channel leakage ratio (ACLR). To reduce such distortions, some wireless devices may apply a power backoff to the non-linear transmission components, which may reduce distortion by bringing an input signal into a linear region. However, as an amount of power backoff implemented by a device increases, power consumption by the device also increases, and less power may effectively be transmitted to a medium. In some aspects, if deployment in a cell supported by a network entity is relatively low, the network entity may reduce an applied power backoff level to conserve power and improve energy savings, but the reduced power backoff level may, in some aspects, increase ACI, which may impact communications by devices in neighboring cells.

Techniques, systems, and devices described herein provide for a network entity to account for interference at UEs in neighboring cells when performing power backoff level reduction, such that the network entity may reduce power consumption and reduce interference with communications in the neighboring cells. In some implementations, the network entity may transmit a resource status request message to one or more neighboring network entities. The network entity may receive corresponding resource status response messages that may indicate levels of resource usage in the respective neighboring cells. The network entity may adjust a power backoff level of the network entity based on the reported levels of resource usage or other reported information. For example, if the reported usage levels are below one or more thresholds, the network entity may reduce the power backoff level. In some examples, the network entity may transmit signaling to the neighboring network entities that indicates an anticipated or estimated interference level associated with the adjusted power backoff level. The neighboring network entities may receive interference reports from UEs in the neighboring cells and may forward the downlink interference measurements to the network entity. For example, a neighboring network entity may transmit a feedback message via a backhaul communication link to indicate the interference measurements. The feedback message may, in some examples, include a suggestion by the neighboring network entity for backoff adaptation based on the interference measurements.

The network entity may maintain the adjusted power backoff level or further adapt (e.g., increase or decrease) the power backoff level based on the interference measurements at the neighboring UEs. If the network entity does not receive interference measurements, or if the interference measurements indicate relatively low levels of downlink interference, the network entity may further increase a power backoff level. If the interference measurements are relatively high, the network entity may reduce the power backoff level to reduce the resulting interference. As such, a network entity described herein may adapt a power backoff level for transmissions by the network entity while accounting for interference experienced in adjacent cells, which may improve throughput and reliability of wireless communications.

Aspects of the disclosure are initially described in the context of wireless communications systems. Aspects of the disclosure are additionally illustrated and described with reference to process flows. Aspects of the disclosure are further illustrated by and described with reference to apparatus diagrams, system diagrams, and flowcharts that relate to network entity backoff power adaptation for wireless communications.

FIG. 1 illustrates an example of a wireless communications system 100 that supports network entity backoff power adaptation for wireless communications in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support network entity backoff power adaptation for wireless communications as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $\Delta_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multipanel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some cases, a transmitter of a wireless communications device, such as a UE 115, may contain one or more non-linear components. For example, the transmitter may contain one or more power amplifiers (PAs) with relatively limited linear dynamic ranges. A relatively high peak-to-average-power ratio (PAPR) of such non-linear components may distort a transmitted signal. The distortion may include in-band distortion, which may affect link performance of mutual information, an error vector magnitude (EVM), or both. Additionally, or alternatively, the distortion may include out-band distortion, which may correspond to out-of-band (OOB) ACI. The ACI may indicate pollution of an adjacent channel caused by a transmission in a first channel (e.g., a main transmission), which may be measured in terms of an ACLR. The ACLR may affect transmissions by UEs 115 operating in neighboring cells.

In some cases, devices in the wireless communications system 100 may be configured with one or more ACI and ACLR parameters (e.g., requirements) to reduce interference between nearby devices. The parameters may, in some aspects, vary per operating frequency band. For example, for frequency bands below 6 GHz, (e.g., SUB6 bands), the ACI or ACLR parameters (e.g., maximum ACI or ACLR) may be around 45 decibels (dBs). For some other frequency bands, such as millimeter wave (mmW) bands (e.g., FR2 bands), the ACI or ACLR parameters (e.g., maximum ACI or ACLR) may be reduced due to a relatively narrower beam structure and higher sensitivity of the network to OOB ACI in the higher frequency bands. For example, the ACI or ACLR parameters may be around 15 dBs.

To reduce distortion (e.g., to satisfy the ACI or ACLR requirements), wireless devices in the wireless communications system 100 may perform a power backoff procedure. The power backoff procedure may reduce distortion by bringing an input signal into a linear region. However, as an amount of power backoff implemented by a device increases, power consumption by the device may increase, and less power may effectively be transmitted to a medium (e.g., an efficiency associated with a PA of the device may be reduced). As such, it may be beneficial to reduce a power backoff level to conserve power and improve energy savings, while maintaining reduced interference at neighboring devices communicating in adjacent frequency bands.

Accordingly, techniques, systems, and devices described herein provide for a network entity 105 to perform power backoff level reduction while reducing interference with communications by UEs 115 in neighboring cells. In some implementations, the network entity 105 may transmit a resource status request message to one or more neighboring network entities 105. The network entity 105 may receive corresponding resource status response messages that may indicate levels of resource usage in the respective neighboring cells. The network entity 105 may adjust a power backoff level for UEs 115 in communication with the network entity 105 based on the reported levels of resource usage or other reported information. For example, if the reported usage levels are below one or more thresholds, the network entity 105 may reduce the power backoff level for the UEs 115 in a cell supported by the network entity 105. In some examples, the network entity 105 may transmit signaling to the neighboring network entities 105 that indicates an anticipated or estimated ACLR associated with the adjusted power backoff level.

A neighboring network entity 105 may receive interference measurements from one or more UEs 115 in a cell supported by the neighboring network entity 105. The neighboring network entity 105 may transmit a feedback message that indicates the interference measurements received from the one or more UEs 115 to the network entity 105 that initiates the power backoff level reduction. The feedback message may, in some aspects, contain a suggestion or command for a power backoff level adaptation. The network entity 105 may maintain or further adjust the power backoff level based on the received feedback. For example, the network entity 105 may reduce the power backoff level if the feedback indicates the neighboring cells are associated with relatively low usage (e.g., low-population areas or cells in areas experiencing low load conditions, such as nighttime conditions). The network entity 105 may increase the power backoff level if the neighbor network entity 105 reports relatively high load conditions or relatively high levels of measured interference. As such, the network entity 105 may reduce power backoff levels based on conditions in neighboring cells, which may support increased power savings for devices in communication with the network entity 105 while reducing interference between cells.

Figure 2:
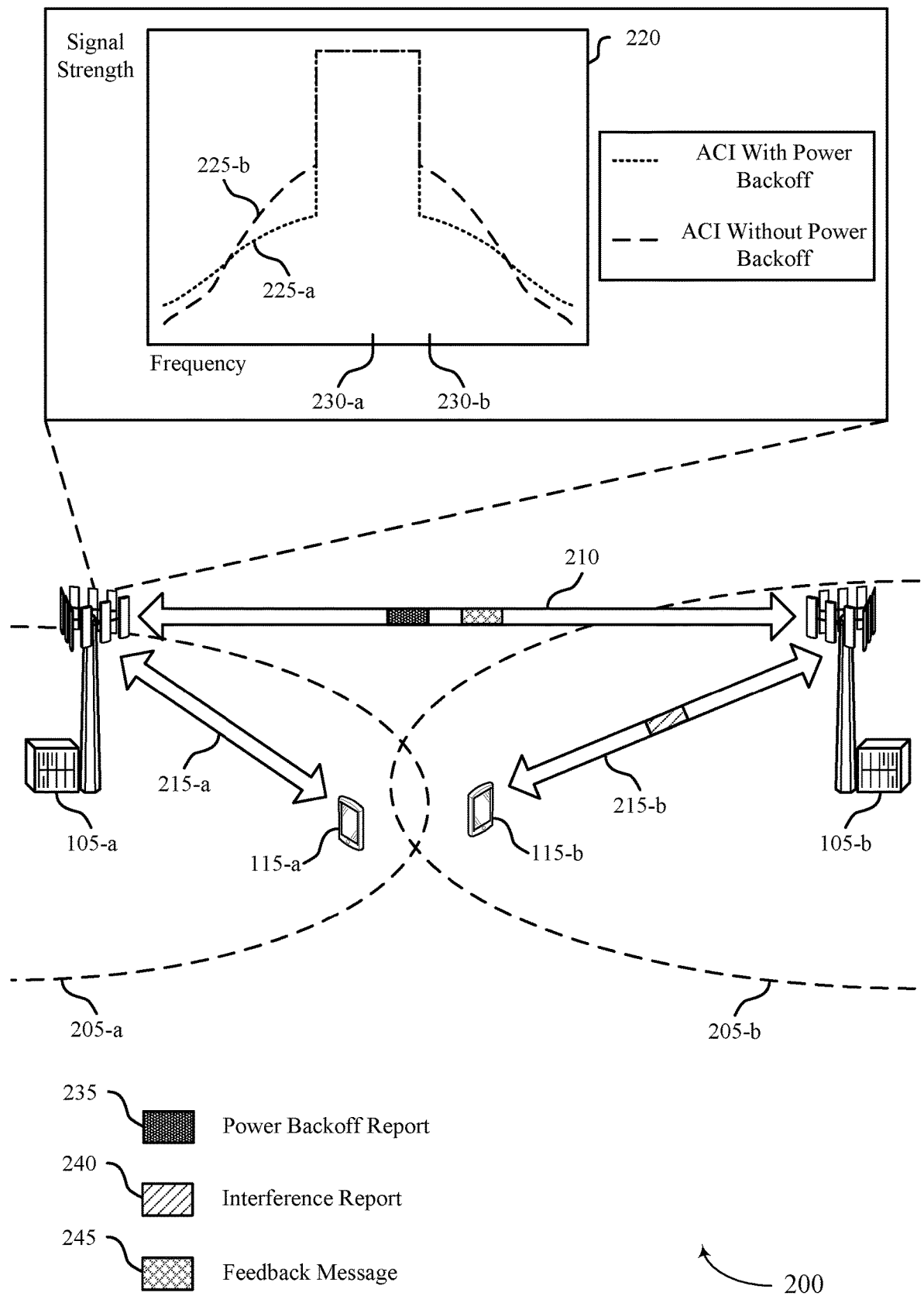
FIG. 2 illustrates an example of a wireless communications system that supports network entity backoff power adaptation for wireless communications in accordance with one or more aspects of the present disclosure.

FIG. 2 illustrates an example of a wireless communications system 200 that supports network entity backoff power adaptation for wireless communications in accordance with one or more aspects of the present disclosure. The wireless communications system 200 may implement or be implemented by aspects of the wireless communications system 100 as described herein with reference to FIG. 1. For example, the wireless communications system 200 may illustrate communications between UEs 115-a and 115-b and network entities 105-a and 105-b, which may be examples of corresponding devices as described herein with reference to FIG. 1. The wireless communications system 200 illustrates geographic coverage areas 205-*a* and 205-*b*, which may be examples of coverage areas 110 as described herein, with reference to FIG. 1. The network entities 105-*a* and 105-*b* may communicate with the UEs 115-*a* and 115-*b* within the geographic coverage areas 205-*a* and 205-*b* (e.g., cells), and via the communication links 215-*a*, and 215-*b*, respectively. In some aspects, the network entity 105-*a* and the network entity 105-*b* may communicate via a backhaul communication link 210 (e.g., an Xn link), which may represent an example of a backhaul communication link 120 as described herein with reference to FIG. 1.

As described herein with reference to FIG. 1, one or more non-linear components of a transmitting device, such as a UE 115 or a network entity 105, may produce distortions in a transmitted signal. The distortions may correspond to ACI or ACLR and may affect or interfere with transmissions by other devices in adjacent frequencies. Power backoff may be applied by a transmitting device to reduce the non-linear distortions. However, the applied power backoff may increase power consumption and reduce efficiency of wireless communications.

In some cases, a network entity 105 may manage or control power backoff application by a UE 115 (e.g., a closed loop control of nonlinear emissions by a UE 115). For example, the network entity 105 may measure an ACLR or an EVM (e.g., or other key performance indicators (KPIs) that may be affected by power backoff) associated with transmissions from the UE 115. The network entity 105 may determine an amount by which the UE 115 should adapt a power backoff (e.g., power amplifier compression) based on the measurements of the KPIs associated with the UE 115 and one or more other UEs 115 in the network. In some cases, if there is a relatively large load on the network (e.g., a relatively large quantity of UEs 115), the network entity 105 may instruct the UE 115 to increase power backoff to reduce overall interference in the network and improve network capacity. The network entity 105 may transmit one or more messages to the UE 115 to indicate the determined amount of power backoff adjustment to be applied by the UE 115. The messages may indicate differential values, absolute values, or both associated with a power of a power amplifier at the UE 115 and the power amplifier backoff level.

In some cases (e.g., low load conditions), the network entity 105-*a* may apply a power backoff at a power amplifier or other transmission component of the network entity 105-*a* to reduce nonlinear distortions. If a load within a cell supported by the network entity 105-*a* is relatively low, the interference produced by the adjusted power backoff may not affect communications within the cell. However, the network entity 105-*a* may not know whether the applied power backoff may interfere with communications in other cells (e.g., the geographic coverage area 205-*b*, or other coverage areas or cells).

The interference diagram 220 illustrates two example ACI curves 225-*a* and 225-*b*. The ACI curves 225-*a* and 225-*b* may represent levels of ACI that may be measured or experienced by wireless devices that communicate across different frequencies due to different levels of power backoff applied by the network entity 105-*a*. For example, the ACI curve 225-*a* may represent ACI levels measured by wireless devices communicating across frequency bands and in different cells when a first level of power backoff is applied by the network entity 105-*a*. The ACI curve 225-*b* may represent ACI levels measured across frequencies when no power backoff is applied by the network entity 105-*a* (e.g., a power backoff level of zero). The ACI curves 225-*a* and 225-*b* may represent the ACI in terms of signal strength. For example, the y-axis on the interference diagram 220 may correspond to power spectral density (PSD), ACLR, or another type of signal strength measurement, which may be measured in units of dBs. The x-axis of the interference diagram 220 may correspond to frequencies across multiple frequency bands 230 (e.g., k, and may be measured in units of Hz). It is noted that while two ACI curves 225 are illustrated as an example in FIG. 2, the network entity 105-*a* and the UE 115-*a* may apply any quantity of power backoff levels, and each power backoff level may correspond to a respective ACI curve 225, including ACI curves 225 different from those illustrated herein.

The network entity 105-*a* may operate at a different frequency band 230 than the network entity 105-*b*. For example, the network entity 105-*a* and the UE 115-*a* may communicate according to a first frequency band 230-*a* (e.g., F1) in the geographic coverage area 205-*a* (e.g., a first serving cell), and the network entity 105-*b* and UE 115-*b* may communicate according to a second frequency band 230-*b* (e.g., F2) in the geographic coverage area 205-*b* (e.g., a second serving cell). As such, transmissions by the network entity 105-*a* in the geographic coverage area 205-*a* may cause interference (e.g., ACI) in channels used by the UE 115-*b* (among other wireless devices in other geographic coverage areas 205), which may operate within a cell of neighboring network entity 105-*b*.

For example, as illustrated by the interference diagram 220, transmissions by the network entity 105-*a* may be associated with a relatively high and stable signal strength within a desired frequency range, such as at the first frequency band 230-*a* via which the network entity 105-*a* communicates. However, as illustrated by the "tails" of the ACI curves 225-*a* and 225-*b*, the transmissions by the network entity 105-*a* may be associated with some signal strength at frequencies that are outside of the intended frequency band 230. That is, wireless devices communicating at the second frequency band 230-*b* may experience some interference due to the transmissions by the network entity 105-*a* at the first frequency band 230-*a*. If the network entity 105-*a* operates with a relatively higher power backoff level, as shown by the ACI curve 225-*a*, a signal strength of the ACI on the second frequency band 230-*b* (e.g., an OOB or adjacent frequency) may be lower than a signal strength of the ACI if the network entity 105-*a* applies a relatively lower power backoff level or does not apply power backoff, as shown by the ACI curve 225-*b*.

Techniques, systems, and devices described herein provide for the network entity 105-*a* to coordinate with other wireless devices when adjusting power backoff, such that interference caused by the adjusted power backoff level of the network entity 105-*a* may be reduced or mitigated. For example, the network entity 105-*a* may exchange one or more messages with neighboring network entities 105, such as the network entity 105-*b* illustrated in FIG. 2 The messages may initiate or permit an initial power backoff adaptation procedure by the network entity 105-*a* and may include feedback information that supports further adaptation over time to reduce resulting interferences.

The network entity 105-*a* may initiate the backoff adaptation procedure based on an amount or status of resource usage in the first cell supported by the network entity 105-*a* and one or more other neighboring cells. The network entity 105-*a* may receive one or more resource status response messages from other network entities 105, such as the network entity 105-*b* that indicate an amount of resource usage in the respective cells. In some examples, the network entity 105-*a* may transmit a resource status request message to request the resource status information for neighboring cells. Such messages for initiating power backoff adaptation are described in further detail elsewhere herein, including with reference to FIG. 3.

If the power backoff adaptation procedure is initiated, the network entity 105-*a* may reduce an amount of power backoff that is applied at the network entity 105-*a*. The network entity 105-*a* may transmit signaling, such as a power backoff report 235, to the network entity 105-*b* to indicate the adjusted power backoff level (e.g., a current power backoff level used by the network entity 105-*a*). The network entity 105-*a* may transmit the power backoff report 235 via a backhaul communication link 210 (e.g., an Xn interface, such as Xn application protocol (XnAP)). In some aspects, the network entity 105-*a* may include an indication of a time (e.g., a slot or sub-slot) at which the backoff adjustment may be applied, an indication of an expected value of interference (e.g., ACI or ACLR) associated with the current power backoff level in the power backoff report 235, or both. For example, the network entity 105-*a* may obtain an estimated interference level from a mapping table at the network entity 105-*a*, and the network entity 105-*a* may include the estimated interference level in the power backoff report 235.

In some examples, the network entity 105-*a* may determine (e.g., calculate or estimate) a set of predicted or estimated levels of interference (e.g., ACLR) that may be produced or may result from a set of power backoff levels applied by the network entity 105-*a*. The network entity 105-*a* may determine which estimated interference level to report based on the determined set. For example, the network entity 105-*a* may, in some examples, generate a mapping table that maps different power backoff levels at the network entity 105-*a* to respective estimated ACLR levels. The network entity 105-*a* may generate the mapping table internally based on one or more measurements or tests by the network entity 105-*a*. Additionally, or alternatively, the network entity 105-*a* may be configured with a mapping table (e.g., defined or configured via control signaling or at deployment of the network entity 105-*a*). As such, the network entity 105-*a* may estimate the curves 225-*a* and 225-*b* or values of the curves 225-*a* and 225-*b* for at least some frequency bands, such as the frequency band 230-*b*.

The network entity 105-*b* may collect interference measurements from the UE 115-*b* and other UEs 115 in the geographic coverage area 205-*b* before the power backoff is applied by the network entity 105-*a*, after the power backoff is applied by the network entity 105-*a*, or both. For example, the UE 115-*b* may receive (e.g., from the network entity 105-*b*) one or more zero power (ZP) CSI-RSs, non-zero power (NZP) CSI-RSs, or other reference signals. The UE 115-*b* may measure the received referenced signals to determine interference, such as a signal-interference-to-noise ratio (SINR) (e.g., SINR comparison), or perform other signal measurements. The UE 115-*b* may transmit an interference report 240 to the network entity 105-*b* to indicate the interference measurements.

In some examples, the network entity 105-*b* may transmit a control message to the UE 115-*b* to indicate a backoff report configuration for the UE 115-*b* to report changes in the downlink interference at the UE 115-*b* based on an adjustment of backoff power in a neighboring cell, such as by the network entity 105-*a*. In such cases, the backoff report configuration may configure the UE 115-*b* to calculate a difference between interference measurements before and after the power backoff level adaptation is enabled by the network entity 105-*a*. The UE 115-*b* may report the difference via the interference report 240. Additionally, or alternatively, the network entity 105-*b* may receive interference reports 240 from the UE 115-*b* before and after the power backoff level adaptation, and the network entity 105-*b* may calculate the difference between the interference measurements before and after the power backoff level adaptation.

The network entity 105-*b* may transmit a feedback message 245 corresponding to the current power backoff level adaptation of the network entity 105-*a* via the backhaul communication link 210. The feedback message 245 may include an indication of the interference measurements received from UE 115-*b* or other UEs 115 in the geographic coverage area 205-*b*. In some examples, the feedback message 245 may indicate the difference between interference measurements (e.g., SINR, or another measurement) before and after the power backoff level adaptation is enabled by network entity 105-*a* (e.g., as determined by the UEs 115, the neighboring network entity 105-*b*, or both). Additionally, or alternatively, the feedback message 245 may indicate measurements that were performed before and measurements that were performed after the power backoff level adaptation is applied by the network entity 105-*a*, and the network entity 105-*a* may determine (e.g., calculate) a difference between the measurement values. In some examples, the feedback message 245 may indicate a backoff adaptation command or suggestion for the network entity 105-*a*. Signaling exchanged between the network entities 105-*a* and 105-*b* via the backhaul communication link 210 is described in further detailed elsewhere herein, including with reference to FIG. 3.

The network entity 105-*a* may determine whether to maintain the adjusted level of power backoff or further adjust the level of power backoff in response to the feedback message 245 received form the network entity 105-*b*. For example, the network entity 105-*a* may determine to decrease the power backoff level in response to reported levels of usage in cells associated with the network entity 105-*b* being below a threshold usage level, interference levels of UEs 115 in neighboring cells (e.g., ACI, ACLR, or another measure of interference) being below a threshold interference level, another condition associated with the wireless communications system 200 being satisfied, or any combination thereof. Alternatively, the network entity 105-*b* may determine to increase the power backoff level in response to reported levels of usage in cells associated with the network entity 105-*b* being above a threshold usage level, interference levels of UEs 115 in neighboring cells (e.g., ACI, ACLR, or another measure of interference) being above a threshold interference level, another condition associated with the wireless communications system 200 being satisfied, or any combination thereof.

In some examples, the feedback message 245 may include an indication of additional interference measurements by the UE 115-*b* performed on an adjacent frequency band 230 (e.g., a frequency band 230 adjacent to the frequency band 230-*b*). The adjacent frequency band 230 may be unaffected (e.g., or affected less) by the power backoff adaptation than the frequency band 230-*b*. In some examples, the network entity 105-*a* may determine whether the power backoff adaptation is the source of interference reported by the interference measurements corresponding to frequency band 230-*b* by the UE 115-*b* using the interference measurements on the adjacent frequency band 230. For example, the network entity 105-*a* may determine that the power backoff adaptation is the source of the interference by determining that the interference measurements corresponding to the frequency band 230-*b* exceed a first threshold and that the additional interference measurements corresponding to the adjacent frequency band 230 are below a second threshold. Alternatively, the UE 115-*b* or the network entity 105-*b* may determine that the power backoff adaptation is the source of the interference (e.g., based on the first and second thresholds and the additional interference measurements) and the feedback message 245 may include an indication of the power backoff adaptation being the source of the interference. The network entity 105-*a* may further adjust the level of power backoff based on determining that the power backoff adaptation is the source of the interference.

The network entity 105-*a* may, in some aspects, iteratively transmit a second power backoff report 235 to the network entity 105-*b* via the backhaul communication link 210. In some examples, the second power backoff report 235 may indicate the adjusted or maintained level of power backoff at the network entity 105-*a*, an expected value of interference (e.g., ACLR) associated with the power backoff level, or both. In some examples, the network entity 105-*a* and the network entity 105-*b* may iteratively adjust power backoff and transmit feedback messages 245 to maintain efficient and reliable communications. In some examples, the network entity 105-*a* may transmit a message via the communication link 215-*a* to UE 115-*a* and other UEs 115 operating in cells associated with the network entity 105-*a* to indicate the change in the power backoff level (e.g., the backoff adaptation).

Accordingly, the techniques described herein provide for the network entity 105-*a* to operate using a reduced power backoff level while reducing interference with communications in neighboring cells.

Figure 3:
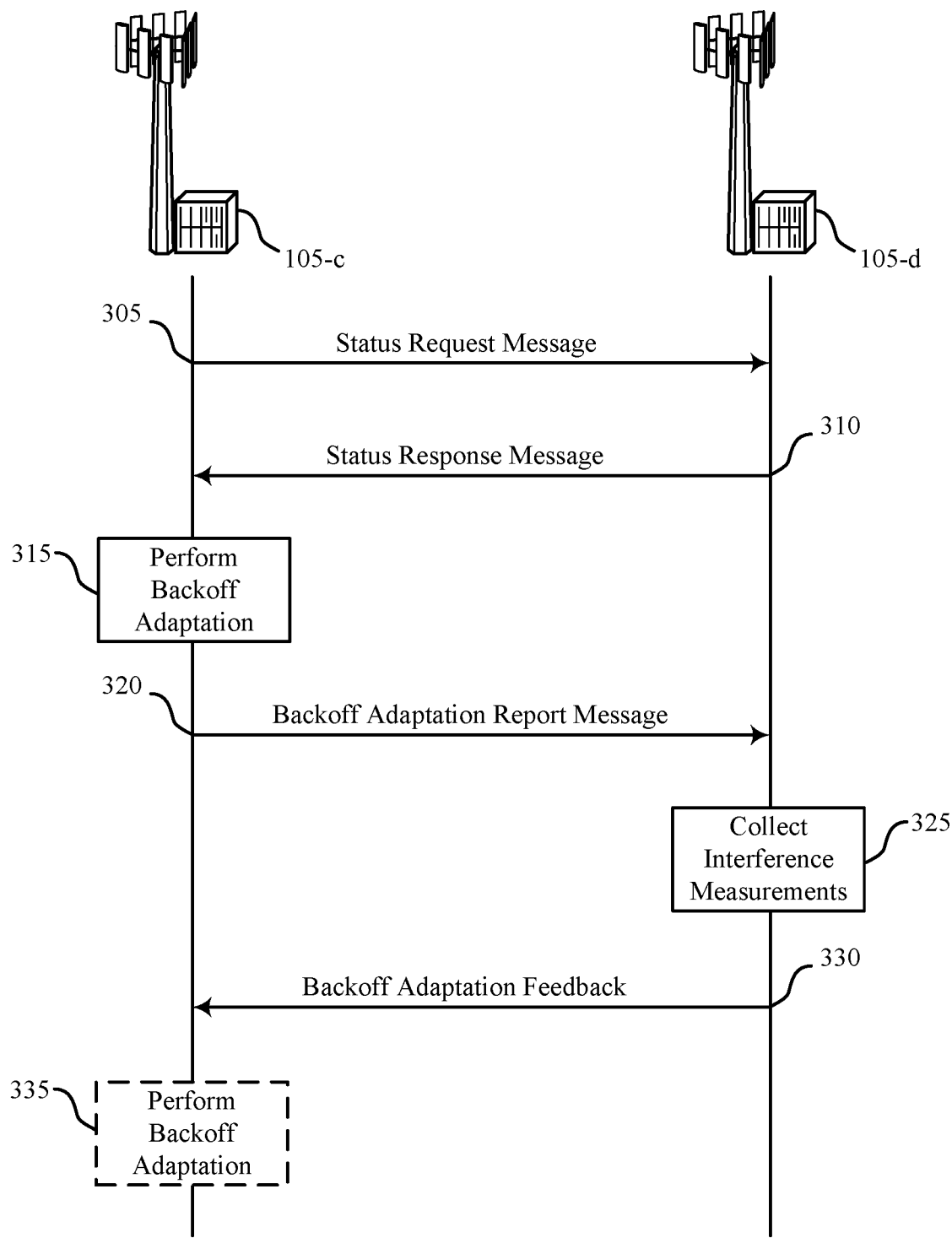
FIG. 3 illustrates an example of a process flow that supports network entity backoff power adaptation for wireless communications in accordance with one or more aspects of the present disclosure.

FIG. 3 illustrates an example of a process flow 300 that supports network entity backoff power adaptation for wireless communications in accordance with one or more aspects of the present disclosure. The process flow 300 may implement or be implemented by aspects of the wireless communications systems 100 and 200 as described herein with reference to FIGS. 1 and 2. For example, the process flow 300 illustrates communications between a network entity 105-*c* and a network entity 105-*d*, which may represent examples of network entities 105 as described herein, including with reference to FIGS. 1 and 2. In some aspects, the network entities 105-*c* and 105-*d* may be neighboring network entities 105. For example, the network entity 105-*c* may communicate with a first set of UEs 115 via a first cell and the network entity 105-*d* may communicate with a second set of UEs 115 via a second cell. In some aspects, the first and second cells may be associated with different operating frequency bands. The network entities 105-*c* and 105-*d* may exchange one or more messages via a backhaul communication link, as described herein with reference to FIGS. 1 and 2.

In the following description of the process flow 300, the operations between the network entity 105-*c* and the network entity 105-*d* may be performed in different orders or at different times. Some operations may also be left out of the process flow 300, or other operations may be added. Although the network entity 105-*c* and the network entity 105-*d* are shown performing the operations of the process flow 300, some aspects of some operations may also be performed by one or more other wireless devices.

At 305, the network entity 105-*c* may transmit a status request message to the network entity 105-*d* via a backhaul communication link (e.g., an Xn interface, such as XnAP). The status request message may request the network entity 105-*d* to transmit information related to resource usage in the second cell supported by the network entity 105-*d*. The information may include a cell load of the second cell supported by the network entity 105-*d*, an indication of resources used by the network entity 105-*d* and UEs 115 in communication with the network entity 105-*d*, other status information, or a combination thereof. In some examples, the network entity 105-*c* may transmit or be triggered to transmit a status request message to multiple neighbor network entities 105, for example, if the network entity 105-*c* determines to attempt or initiate power backoff level adaptation procedures.

At 310, the network entity 105-*d* may transmit a status response message to the network entity 105-*c*. The status response message may include the information requested by the network entity 105-*c*. For example, the status response message may convey information regarding a cell load of the network entity 105-*d*, resources used by the network entity 105-*d* and UEs 115 in communication with the network entity 105-*d*, other status information, or a combination thereof. In some examples, the network entity 105-*d* may transmit the status response message without receiving a status request message. For example, the network entity 105-*d* may observe that a cell load associated with network entity 105-*d* is below a threshold load and may determine to transmit the status response message based on the relatively low cell load and without receiving the status request message.

In some examples, the network entity 105-*d* may transmit, via the status response message to the network entity 105-*c*, an indication that power backoff level adaptation is permitted by the network entity 105-*c*. For example, if the network entity 105-*d* determines one or more conditions associated with network resource usage are satisfied, the network entity 105-*d* may trigger or permit power backoff level adaptation at the network entity 105-*c*. In some examples, the one or more conditions that may trigger the network entity 105-*d* to permit power backoff level adaptation by the network entity 105-*c* may include resource usage within the second cell supported by the network entity 105-*d* being relatively low or below a threshold. The resource usage may correspond to a quantity of downlink physical resource blocks (PRBs), a quantity of PDCCH CCEs, some other quantity of resources, or any combination thereof used within a given area or for a given type of communication.

For example, if the quantity of downlink PRBs or PDCCH CCEs used within the second cell (e.g., total PRB or PDCCH CCE usage), used within a synchronization signal block (SSB) area, used within a network slice radio area for downlink communications, used for MIMO downlink communications, used for guaranteed bit rate (GBR) communications, or any combination thereof is less than a threshold, the network entity 105-*d* may transmit the status response message to the network entity 105-*c* indicating that power backoff level adaptation is allowed. In some examples, different thresholds may be configured for each type of resource usage and each resource usage area. For example, a first threshold may be configured for determining whether to trigger power backoff adaptation based on total PRB usage in a cell, a second threshold may be configured for determining whether to trigger power backoff adaptation based on a total PDCCH CCE usage in the cell, a third threshold may be configured for determining whether to trigger power backoff adaptation based on a PRB usage in an SSB area, a fourth threshold may be configured for determining whether to trigger power backoff adaptation based on PDCCH CCE usage in the SSB area, and the like.

At 315, the network entity 105-c may perform power backoff level adaptation (i.e., backoff adaptation). The network entity 105-c may perform the power backoff level adaptation based on the status response message, based on a determination at the network entity 105-c, or both. For example, if the network entity 105-d indicates, via the status response message, that power backoff level adaptation is allowed, the network entity 105-c may reduce the level of power backoff accordingly. Additionally, or alternatively, the network entity 105-c may determine to perform the power backoff level adaptation based on a condition being met. For example, the status response message may indicate the quantities of resource usage (e.g., PRBs or PDCCH CCEs used within a cell, an SSB area, a network slice, for MIMO communications, for GBR communications, or any combination thereof), and the network entity 105-c may determine whether to initiate power backoff level adjustment based on the indicated resource usage associated with the second cell supported by the network entity 105-d, a resource usage of a first cell supported by the network entity 105-c, or both. The network entity 105-c may utilize the respective threshold values for each of the types of resource usage to determine whether to initiate power backoff level adaptation. The thresholds may be defined or configured at the network entities 105-c and 105-d (e.g., defined in a standard) or indicated via control signaling.

Performing the power backoff adaptation may include the network entity 105-c reducing or increasing a level of power backoff applied to one or more power amplifiers or other transmission components of the network entity 105-c, as described in more detail herein, with reference to FIGS. 1 and 2. The network entity 105-c may, in some aspects, transmit one or more messages the UEs 115 in communication with the network entity 105-c to indicate the adapted power backoff level.

At 320, the network entity 105-c may transmit a backoff adaptation report message to the network entity 105-d after adjusting the power backoff. The backoff adaptation report message may indicate an estimated ACLR associated with the power backoff level adaptation. For example, the network entity 105-c may determine (e.g., via measurements, tests, estimates, or a previous configuration) a mapping table between a power backoff level and a respective ACLR and report the ACLR value corresponding to the adapted power backoff level at the network entity 105-c. In some examples, the network entity 105-c may report, via the backoff adaptation report message or some other message, a time (e.g., one or more slots or sub-slots) at which the power backoff level adaptation may be applied or activated. In some cases, the network entity 105-c may request, via the backoff adaptation report message or some other message, that the network entity 105-d increase a frequency band margin between adjacent frequency bands or frequency bands in proximity. For example, the network entity 105-c may request or instruct the network entity 105-d to increase a frequency band margin between a first frequency band associated with communications via the first cell supported by the network entity 105-c and a second frequency band associated with communications via the second cell supported by the network entity 105-d. In such cases, the network entity 105-d may schedule communications by one or more UEs 115 via a center of the second frequency band, and the network entity 105-d may reduce an amount of communications that are scheduled near one or both edges of the second frequency band. By increasing a margin between communications in adjacent frequency bands, the network entities 105 may reduce interference (e.g., ACI), as shown, for example, in the interference diagram 220 illustrated in FIG. 2.

At 325, the network entity 105-d may receive and collect interference measurements (e.g., via Uu signaling) from one or more UEs 115 operating within cells of network entity 105-d, as described herein with reference to FIG. 2. In some examples, the interference measurements may include a comparison between interference values measured before the backoff level adaptation and interference values measured after the backoff level adaptation. Additionally, or alternatively, the network entity 105-d may compare interference measurements reported by the UEs 115 before the power backoff level adaptation and interference measurements reported after the power backoff level adaptation.

At 330, the network entity 105-d may transmit backoff adaptation feedback to the network entity 105-c (e.g., via an Xn interface, such as XnAP) via a feedback message. In some cases, the network entity 105-d may indicate a command or suggestion to increase or decrease the power backoff level to the network entity 105-d based on the interference measurements collected from the UEs 115. Additionally, or alternatively, the network entity 105-d may report one or more of the collected interference measurements to the network entity 105-c. For example, the network entity 105-d may report a difference between interference levels before and after the power backoff level adaptation, or report interference measurements performed before and after the power backoff level adaptation.

At 335, the network entity 105-c may, in some examples, perform backoff adaptation in response to the backoff adaptation feedback received from the network entity 105-d (e.g., and other neighboring network entities 105). For example, the network entity 105-d may increase or decrease a power backoff level based on a command or suggestion by the network entity 105-d. Additionally, or alternatively, the network entity 105-d may adjust the power backoff level based on a change in the interference measurements reported by UEs 115 in the neighboring cells (e.g., an ACLR change). The change may be determined (e.g., measured or calculated) based on a reported difference between interference levels before and after the power backoff level adaptation determined from the backoff adaptation feedback or may be indicated by the UEs 115. In some other examples, the network entity 105-d may adjust the power backoff level based on one or more parameters values reported by the network entity 105-d.

In some examples, the network entity 105-c may maintain the power backoff level based on the backoff adaptation feedback. That is, the network entity 105-c may refrain from further adjusting the power backoff. The network entity 105-c may thereby exchange one or more messages with one or more other neighboring network entities 105 to determine whether to adjust a power backoff level. In some examples, the network entity 105-c may combine or aggregate feedback received from multiple other network entities 105 to use for determining whether to perform power backoff adaptation. By accounting for feedback from the neighboring network entities 105, the network entity 105-c may balance the power and energy savings associated with reduced power backoff while reducing interference and maintaining reliable communications in neighboring cells.

Figure 4:
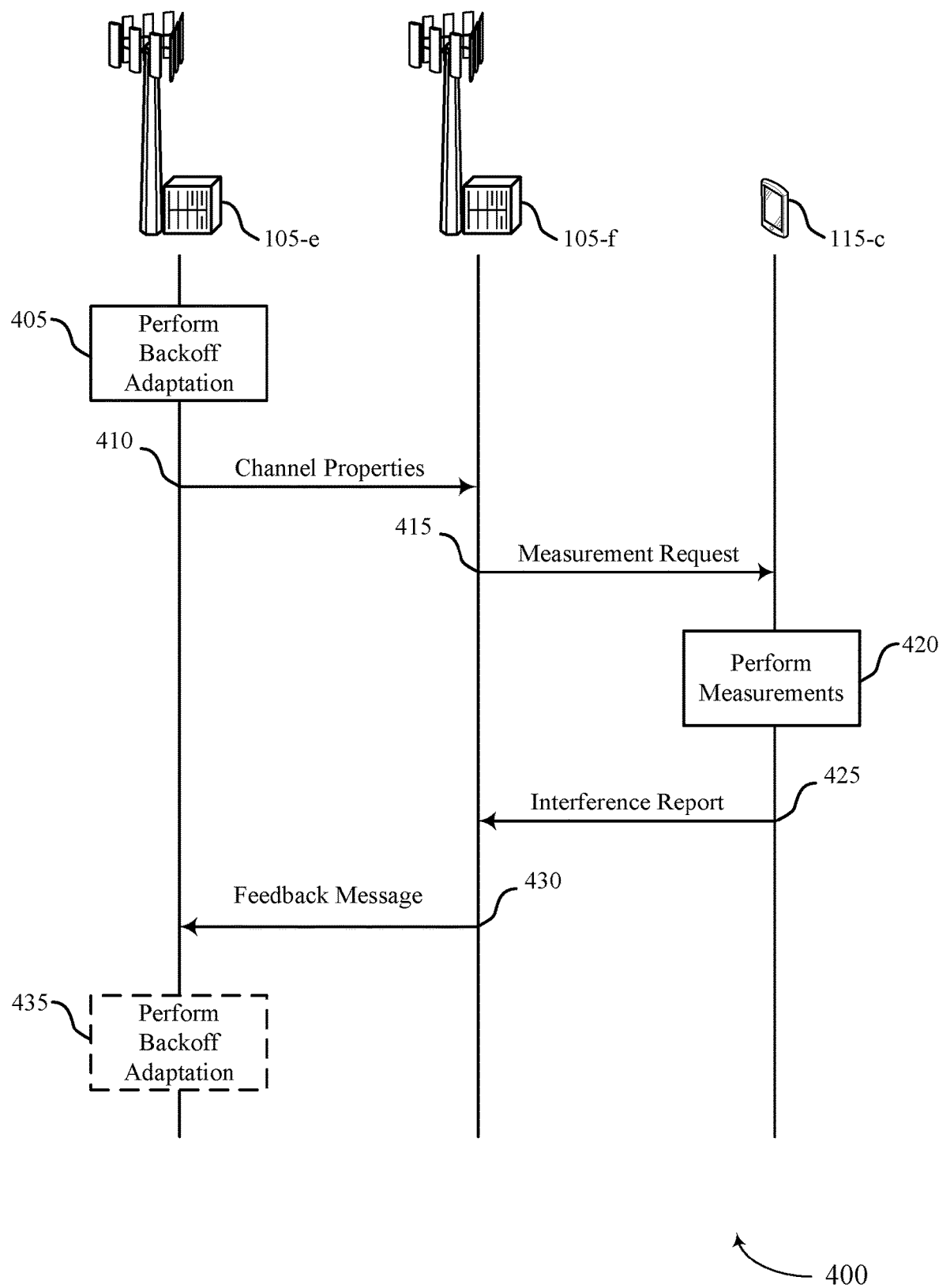
FIG. 4 illustrates an example of a process flow that supports network entity backoff power adaptation for wireless communications in accordance with one or more aspects of the present disclosure.

FIG. 4 illustrates an example of a process flow 400 that supports network entity backoff power adaptation for wireless communications in accordance with one or more aspects of the present disclosure. The process flow may illustrate communications between a UEs 115-c and network entities 105-e and 105-f, which may be examples of corresponding devices as described herein with reference to FIGS. 1-3. In some aspects, the network entities 105-c and 105-d may be neighboring network entities 105. For example, the network entity 105-e may communicate with a first set of UEs 115 via a first cell and the network entity 105-f may communicate with a second set of UEs 115 including the UE 115-c via a second cell. In some aspects, the first and second cells may be associated with different operating frequency bands. The network entities 105-e and 105-f may exchange one or more messages via a backhaul communication link, as described herein with reference to FIGS. 1 and 2. In some examples, the messages may be based on interference measurements from the UE 115-c and other UEs 115 in neighboring cells.

In the following description of the process flow 400, the operations between the network entity 105-e, the network entity 105-f, and the UE 115-c may be performed in different orders or at different times. Some operations may also be left out of the process flow 400, or other operations may be added. Although the network entity 105-e, the network entity 105-f, and the UE 115-c are shown performing the operations of the process flow 400, some aspects of some operations may also be performed by one or more other wireless devices.

At 405, the network entity 105-e may perform power backoff level adaptation based on the status response message. For example, the network entity 105-e may adjust a backoff power level for communications by the network entity 105-e in a first cell. In some examples, the network entity 105-e may adjust the power backoff level based on a comparison of a first quantity of resources used for communications in the first cell supported by the network entity 105-e a second quantity of resources used for communications in the second cell supported by the network entity 105-f, or both with a threshold quantity. The second quantity of resources may be indicated via a resource status response message received from the network entity 105-f. In some cases, the first and second quantities of resources indicated by the network entity 105-f may correspond to a quantity of PRBs, a quantity of PDCCH CCEs, or both, and the first and second quantities may include resources associated with a respective cell, an SSB area, a network slice, MIMO communications, GBR communications, or any combination thereof.

At 410, the network entity 105-e may transmit signaling that indicates one or more channel properties to the network entity 105-f. The signaling may be transmitted via the backhaul link between the network entities 105-e and 105-f. The channel properties may include an estimated level of interference (e.g., an ACLR) in the second cell supported by the network entity 105-f based on the adjust power backoff level at the network entity 105-e. In some examples, the network entity 105-e may determine a set (e.g., table) of estimated levels of interference in the second cell that are each associated with a respective backoff power level at the network entity 105-e based on an interference estimation procedure (e.g., prior to initiating power backoff adaptation), and the network entity 105-e may select the estimated level of interference form the set based on the adjusted backoff power level.

In some examples, the signaling may indicate a time at which the adjusted power backoff adaptation and the estimated level of interference associated with the power backoff adaptation may be applied. In some cases, the network entity 105-e may transmit, via the signaling, a request to the network entity 105-f to increase a frequency band margin between a first frequency associated with communications via the first cell of the network entity 105-e and a second frequency associated with communications via the second cell of the network entity 105-f.

At 415, in some examples, the network entity 105-f may transmit a control message to the UE 115-c to indicate a power backoff report configuration for reporting changes in downlink interference measurements at the UE 115-c based on the power backoff adaptation at the network entity 105-e. The control message may include a time at which the power backoff adaptation is to be applied and may configure the UE 115-c to transmit one or more interference reports indicating a difference between downlink interference measurements obtained by the UE 115-c before and after the time at which the power backoff adaptation is applied.

At 420, the UE 115-c may perform the interference measurements. The UE 115-c may perform interference measurements before a time at which the power backoff adaptation is applied and after the time at which the power backoff adaptation is applied. In some cases, the UE 115-c may measure the interference levels after the time at which the power backoff adaptation is applied in response to a request by the network entity 105-f (e.g., the measurement request received from the network entity 105-f or some other trigger).

At 425, the UE 115-c may transmit an interference report to the network entity 105-f to indicate the interference measurements by the UE 115-c. In some examples, the UE 115-c may transmit the interference report if the measured levels of downlink interference after the power backoff adaptation is applied are greater than the levels of downlink interference before the power backoff adaptation is applied by a threshold amount. For example, the UE 115-c may determine a difference between the measured levels of downlink interference and indicate the difference in the interference report. Additionally, or alternatively, the UE 115-c may compare the difference with the threshold amount and indicate that the difference is greater than the threshold. In some examples, the threshold may be indicated by the network entity 105-f (e.g., in the measurement request). In some cases, the UE 115-c may report interference measurements without determining a difference between the levels, and the network entity 105-f may determine a difference based on one or more received interference reports.

At 430, the network entity 105-f may transmit a feedback message to the network entity 105-e to indicate the downlink interference measurements based on the power backoff adaptation at the network entity 105-e. The feedback message may, in some examples, include a difference between measurements obtained by the UE 115-c (e.g., and one or more other UEs 115) before and after the power backoff adaptation. Additionally, or alternatively, the feedback message may include a backoff adaptation command or suggestion that instructs or permits the network entity 105-e to increase or decrease the backoff power level based on the interference measurements from the UE 115-c. In some examples, the feedback message may indicate an amount by which the backoff power level may be adjusted by the network entity 105-e.

At 435, the network entity 105-e may, in some examples, adapt the backoff power level based on the feedback received from the network entity 105-f. For example, the network entity 105-e may adapt the backoff power level for communications in the first cell of the network entity 105-e based on the downlink interference measurements indicated in the feedback message. Additionally, or alternatively, the network entity 105-e may increase or decrease the power backoff level based on a received command or suggestion from the network entity 105-f. In some other examples, the network entity 105-e may maintain the adjusted backoff power level.

Figure 5:
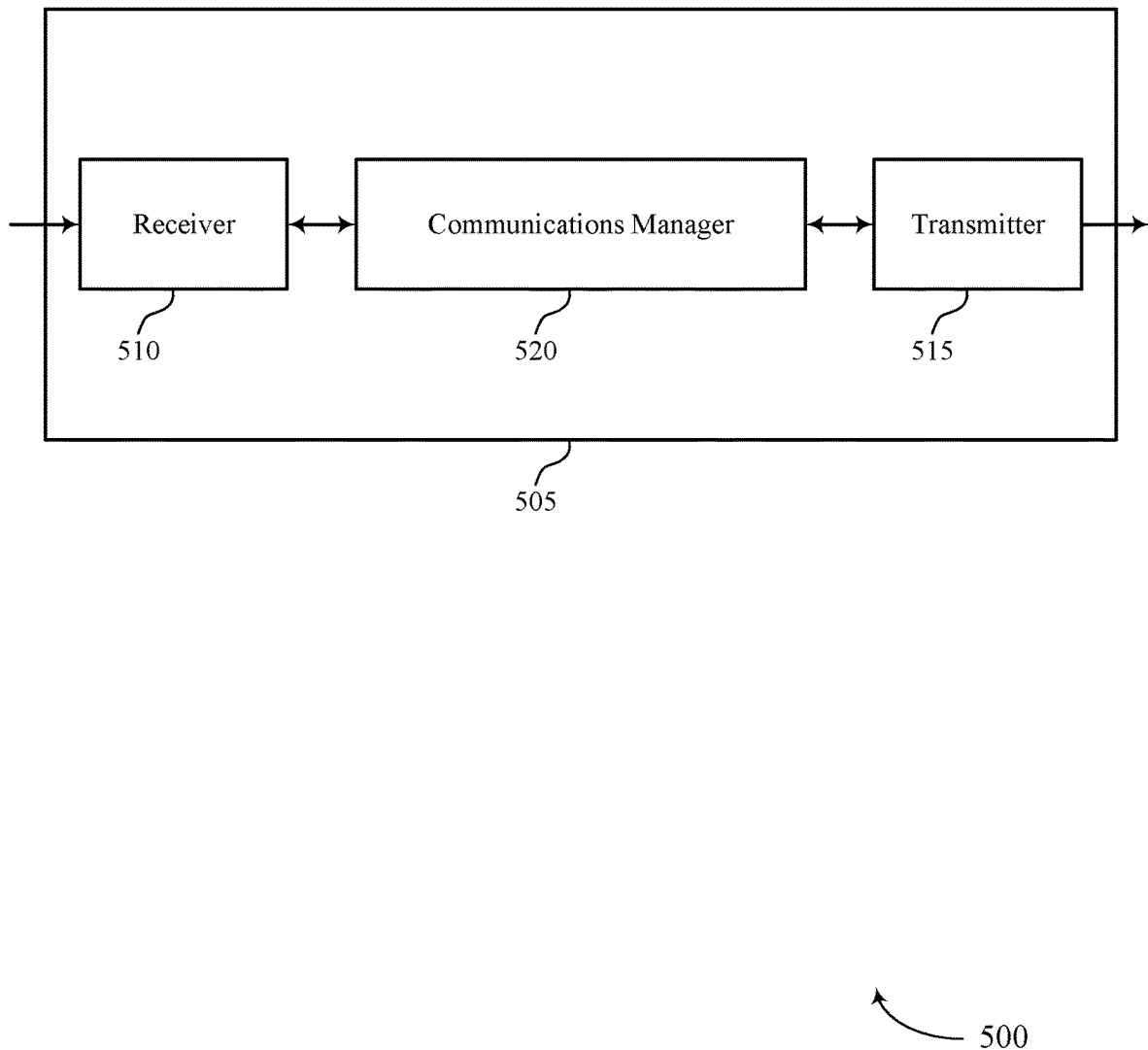
FIGS. 5 and 6 show block diagrams of devices that support network entity backoff power adaptation for wireless communications in accordance with one or more aspects of the present disclosure.

FIG. 5 shows a block diagram 500 of a device 505 that supports network entity backoff power adaptation for wireless communications in accordance with one or more aspects of the present disclosure. The device 505 may be an example of aspects of a network entity 105 as described herein. The device 505 may include a receiver 510, a transmitter 515, and a communications manager 520. The device 505 may also include a processor (not shown). Each of these components may be in communication with one another (e.g., via one or more buses).

The receiver 510 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 505. In some examples, the receiver 510 may support obtaining information by receiving signals via one or more antennas. Additionally, or alternatively, the receiver 510 may support obtaining information by receiving signals via one or more wired (e.g., electrical, fiber optic) interfaces, wireless interfaces, or any combination thereof.

The transmitter 515 may provide a means for outputting (e.g., transmitting, providing, conveying, sending) information generated by other components of the device 505. For example, the transmitter 515 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 515 may support outputting information by transmitting signals via one or more antennas. Additionally, or alternatively, the transmitter 515 may support outputting information by transmitting signals via one or more wired (e.g., electrical, fiber optic) interfaces, wireless interfaces, or any combination thereof. In some examples, the transmitter 515 and the receiver 510 may be co-located in a transceiver, which may include or be coupled with a modem.

The communications manager 520, the receiver 510, the transmitter 515, or various combinations thereof or various components thereof may be examples of means for performing various aspects of network entity backoff power adaptation for wireless communications as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a first network entity in accordance with examples as disclosed herein. For example, the communications manager 520 may be configured as or otherwise support a means for adjusting a backoff power level for communications by the first network entity in a first cell. The communications manager 520 may be configured as or otherwise support a means for transmitting signaling that indicates an estimated level of interference in a second cell supported by a second network entity, the estimated level of interference based on the adjusted backoff power level for the communications by the first network entity in the first cell. The communications manager 520 may be configured as or otherwise support a means for receiving, based on the estimated level of interference, a feedback message that indicates downlink interference measurements by at least one UE of a set of UEs in the second cell, where the downlink interference measurements are based on the adjusted backoff power level.

Additionally, or alternatively, the communications manager 520 may support wireless communication at a second network entity in accordance with examples as disclosed herein. For example, the communications manager 520 may be configured as or otherwise support a means for receiving signaling that indicates an estimated level of interference in a cell supported by the second network entity, the estimated level of interference based on an adjusted backoff power level at a first network entity. The communications manager 520 may be configured as or otherwise support a means for receiving at least one interference report that indicates downlink interference measurements by a UE of a set of UEs in the cell. The communications manager 520 may be configured as or otherwise support a means for transmitting, based on the estimated level of interference and the at least one interference report, a feedback message that indicates the downlink interference measurements, where the downlink interference measurements are based on the adjusted backoff power level.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for backoff power adaptation with reduced power consumption, improved coordination between devices, and more efficient utilization of resources.

Figure 6:
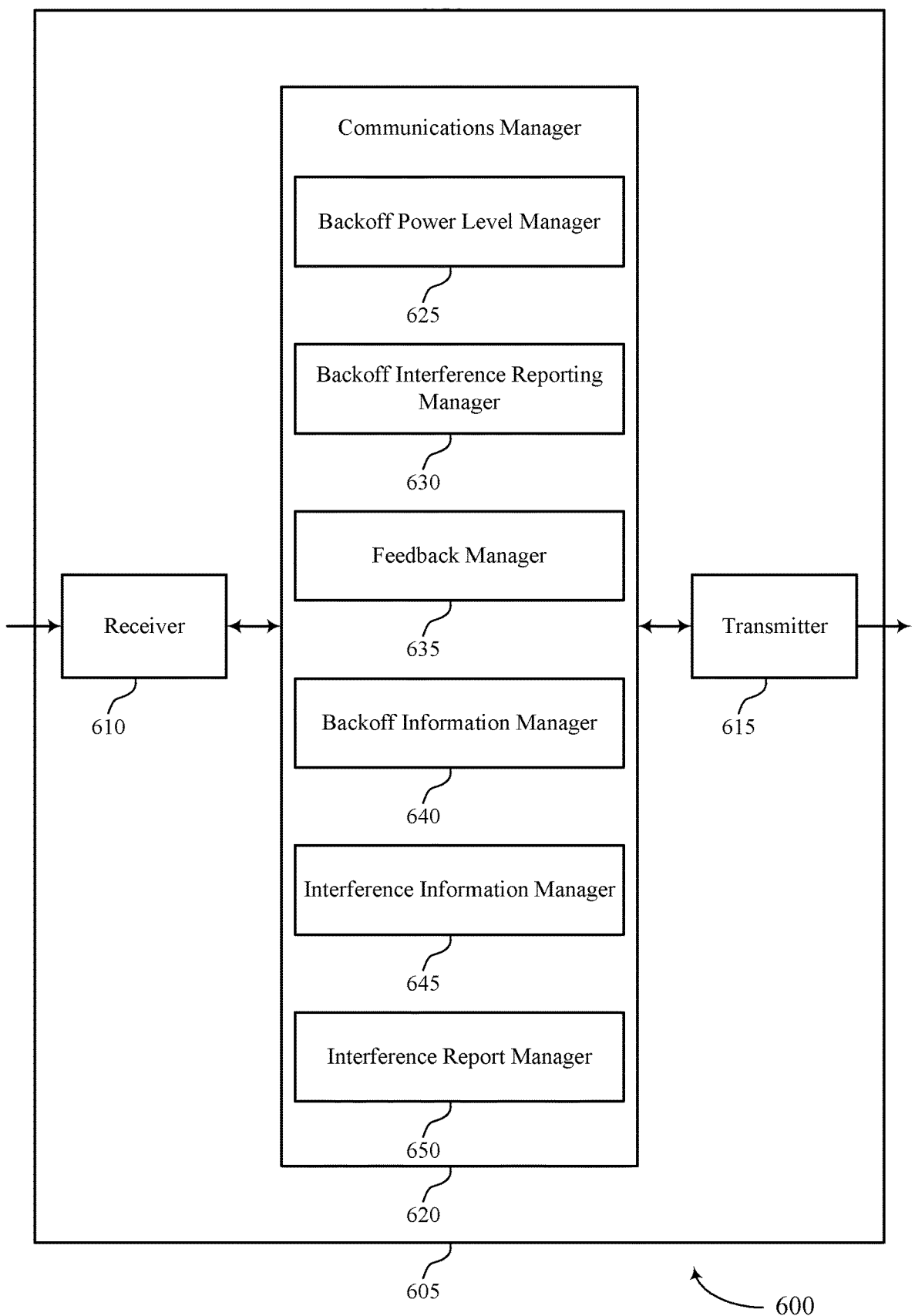

FIG. 6 shows a block diagram 600 of a device 605 that supports network entity backoff power adaptation for wireless communications in accordance with one or more aspects of the present disclosure. The device 605 may be an example of aspects of a device 505 or a network entity 105 as described herein. The device 605 may include a receiver 610, a transmitter 615, and a communications manager 620. The device 605 may also include a processor (not shown). Each of these components may be in communication with one another (e.g., via one or more buses).

The receiver 610 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 605. In some examples, the receiver 610 may support obtaining information by receiving signals via one or more antennas. Additionally, or alternatively, the receiver 610 may support obtaining information by receiving signals via one or more wired (e.g., electrical, fiber optic) interfaces, wireless interfaces, or any combination thereof.

The transmitter 615 may provide a means for outputting (e.g., transmitting, providing, conveying, sending) information generated by other components of the device 605. For example, the transmitter 615 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 615 may support outputting information by transmitting signals via one or more antennas. Additionally, or alternatively, the transmitter 615 may support outputting information by transmitting signals via one or more wired (e.g., electrical, fiber optic) interfaces, wireless interfaces, or any combination thereof. In some examples, the transmitter 615 and the receiver 610 may be co-located in a transceiver, which may include or be coupled with a modem.

The device 605, or various components thereof, may be an example of means for performing various aspects of network entity backoff power adaptation for wireless communications as described herein. For example, the communications manager 620 may include a backoff power level manager 625, a backoff interference reporting manager 630, a feedback manager 635, a backoff information manager 640, an interference information manager 645, an interference report manager 650, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a first network entity in accordance with examples as disclosed herein. The backoff power level manager 625 may be configured as or otherwise support a means for adjusting a backoff power level for communications by the first network entity in a first cell. The backoff interference reporting manager 630 may be configured as or otherwise support a means for transmitting signaling that indicates an estimated level of interference in a second cell supported by a second network entity, the estimated level of interference based on the adjusted backoff power level for the communications by the first network entity in the first cell. The feedback manager 635 may be configured as or otherwise support a means for receiving, based on the estimated level of interference, a feedback message that indicates downlink interference measurements by at least one UE of a set of UEs in the second cell, where the downlink interference measurements are based on the adjusted backoff power level.

Additionally, or alternatively, the communications manager 620 may support wireless communication at a second network entity in accordance with examples as disclosed herein. The backoff information manager 640 may be configured as or otherwise support a means for receiving signaling that indicates an estimated level of interference in a cell supported by the second network entity, the estimated level of interference based on an adjusted backoff power level at a first network entity. The interference information manager 645 may be configured as or otherwise support a means for receiving at least one interference report that indicates downlink interference measurements by a UE of a set of UEs in the cell. The interference report manager 650 may be configured as or otherwise support a means for transmitting, based on the estimated level of interference and the at least one interference report, a feedback message that indicates the downlink interference measurements, where the downlink interference measurements are based on the adjusted backoff power level.

Figure 7:
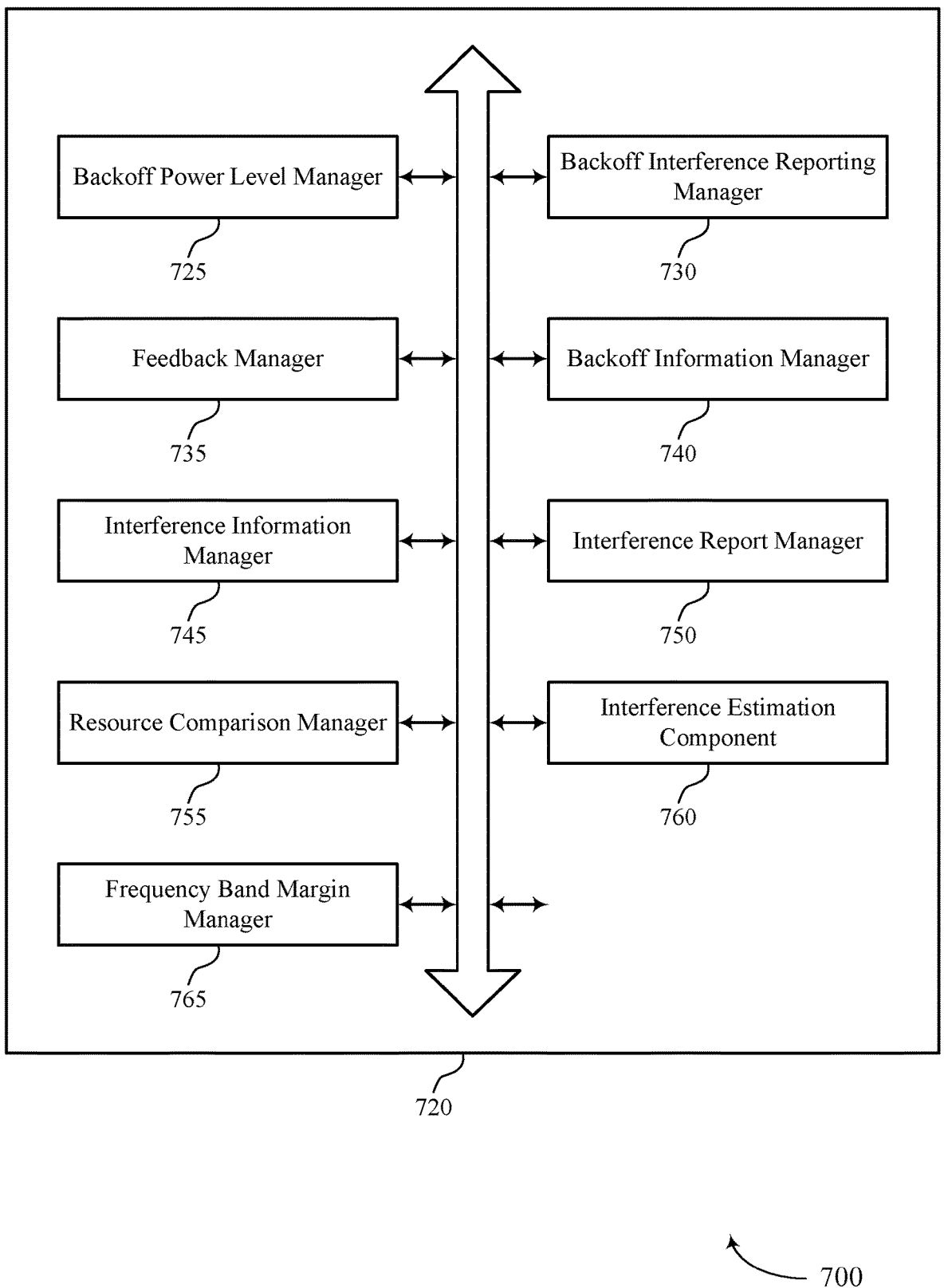
FIG. 7 shows a block diagram of a communications manager that supports network entity backoff power adaptation for wireless communications in accordance with one or more aspects of the present disclosure.

FIG. 7 shows a block diagram 700 of a communications manager 720 that supports network entity backoff power adaptation for wireless communications in accordance with one or more aspects of the present disclosure. The communications manager 720 may be an example of aspects of a communications manager 520, a communications manager 620, or both, as described herein. The communications manager 720, or various components thereof, may be an example of means for performing various aspects of network entity backoff power adaptation for wireless communications as described herein. For example, the communications manager 720 may include a backoff power level manager 725, a backoff interference reporting manager 730, a feedback manager 735, a backoff information manager 740, an interference information manager 745, an interference report manager 750, a resource comparison manager 755, an interference estimation component 760, a frequency band margin manager 765, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 720 may support wireless communication at a first network entity in accordance with examples as disclosed herein. The backoff power level manager 725 may be configured as or otherwise support a means for adjusting a backoff power level for communications by the first network entity in a first cell. The backoff interference reporting manager 730 may be configured as or otherwise support a means for transmitting signaling that indicates an estimated level of interference in a second cell supported by a second network entity, the estimated level of interference based on the adjusted backoff power level for the communications by the first network entity in the first cell. The feedback manager 735 may be configured as or otherwise support a means for receiving, based on the estimated level of interference, a feedback message that indicates downlink interference measurements by at least one UE of a set of UEs in the second cell, where the downlink interference measurements are based on the adjusted backoff power level.

In some examples, the backoff power level manager 725 may be configured as or otherwise support a means for adapting, based on the downlink interference measurements indicated via the feedback message, the backoff power level for the communications in the first cell.

In some examples, to support adapting the backoff power level, the backoff power level manager 725 may be configured as or otherwise support a means for increasing or decreasing the adjusted backoff power level based on the backoff adaptation command.

In some examples, to support receiving the feedback message, the feedback manager 735 may be configured as or otherwise support a means for receiving, via the feedback message, a difference between a first set of downlink interference measurements obtained by the at least one UE before the backoff power level is adjusted and a second set of downlink interference measurements by the at least one UE after the backoff power level is adjusted, where adapting the backoff power level is based on the difference being greater than a threshold.

In some examples, the downlink interference measurements are associated with a second frequency band, the second frequency band associated with communications via the second cell. In some examples, the feedback message further indicates additional downlink interference measurements by the at least one UE of the set of UEs in a third frequency band adjacent to the second frequency band, the adapting the backoff power level being based on the additional downlink interference measurements.

In some examples, the backoff power level manager 725 may be configured as or otherwise support a means for receiving a resource status response message that initiates a backoff adaptation procedure, where adjusting the backoff power level is based on the received resource status response message. In some examples, the resource status response message indicates that a quantity of resources used for communications in the second cell is less than a threshold quantity.

In some examples, the backoff power level manager 725 may be configured as or otherwise support a means for transmitting a resource status request message to initiate the backoff adaptation procedure, where receiving the resource status response message is based on the resource status request message.

In some examples, the resource comparison manager 755 may be configured as or otherwise support a means for comparing a first quantity of resources used for the communications in the first cell, a second quantity of resources used for second communications in the second cell, or both with a threshold quantity, where adjusting the backoff power level is based on one or both of the first quantity or the second quantity being less than the threshold quantity.

In some examples, the first quantity and the second quantity correspond to a quantity of physical resource blocks, a quantity of downlink control channel elements, or both. In some examples, the first quantity and the second quantity include resources associated with a respective cell, resources associated with a synchronization signal block area, resources associated with a network slice, resources associated with multiple-input multiple-output communications, resources associated with guaranteed bit rate communications, or any combination thereof. In some examples, the threshold quantity is based on a type of resource usage.

In some examples, the interference estimation component 760 may be configured as or otherwise support a means for determining, based on an interference estimation procedure, a set of multiple estimated levels of interference in the second cell, each estimated level of interference associated with a respective backoff power level of a set of multiple backoff power levels at the first network entity. In some examples, the interference estimation component 760 may be configured as or otherwise support a means for selecting the estimated level of interference from the set of multiple estimated levels of interference based on the adjusted backoff power level.

In some examples, to support transmitting the signaling, the backoff interference reporting manager 730 may be configured as or otherwise support a means for transmitting, via the signaling, an indication of a first time at which the adjusted backoff power level and the estimated level of interference associated with the adjusted backoff power level will be applied.

In some examples, the frequency band margin manager 765 may be configured as or otherwise support a means for transmitting, based on the adjusted backoff power level and the estimated level of interference, a request for the second network entity to increase a frequency band margin between a first frequency band associated with the communications via the first cell and a second frequency band associated with second communications via the second cell.

In some examples, the first cell is associated with a first frequency band. In some examples, the second cell is associated with a second frequency band. In some examples, the estimated level of interference corresponds to an estimated adjacent channel leakage ratio in the second frequency band based on the communications in the first frequency band.

Additionally, or alternatively, the communications manager 720 may support wireless communication at a second network entity in accordance with examples as disclosed herein. The backoff information manager 740 may be configured as or otherwise support a means for receiving signaling that indicates an estimated level of interference in a cell supported by the second network entity, the estimated level of interference based on an adjusted backoff power level at a first network entity. The interference information manager 745 may be configured as or otherwise support a means for receiving at least one interference report that indicates downlink interference measurements by a UE of a set of UEs in the cell. The interference report manager 750 may be configured as or otherwise support a means for transmitting, based on the estimated level of interference and the at least one interference report, a first feedback message that indicates the downlink interference measurements, where the downlink interference measurements are based on the adjusted backoff power level.

In some examples, to support transmitting the first feedback message, the interference report manager 750 may be configured as or otherwise support a means for transmitting, via the first feedback message, a difference between a first set of downlink interference measurements obtained by the UE before a backoff power level is adjusted at the first network entity and a second set of downlink interference measurements obtained by the UE after the backoff power level is adjusted at the first network entity.

In some examples, to support transmitting the first feedback message, the interference report manager 750 may be configured as or otherwise support a means for transmitting, via the first feedback message, a backoff adaptation command that instructs the first network entity to increase or decrease the adjusted backoff power level based on the downlink interference measurements from the UE.

In some examples, the interference information manager 745 may be configured as or otherwise support a means for determining a quantity of resources used for communications in the cell is less than a threshold quantity. In some examples, the interference report manager 750 may be configured as or otherwise support a means for transmitting a resource status response message that indicates the quantity of resources used for communications in the cell is less than the threshold quantity, where receiving the signaling that indicates the estimated level of interference is based on the resource status response message.

In some examples, the backoff information manager 740 may be configured as or otherwise support a means for receiving a resource status request message that initiates a backoff adaptation procedure, where transmitting the resource status response message is based on the resource status request message.

In some examples, the quantity of resources corresponds to a quantity of physical resource blocks, a quantity of downlink control channel elements, or both. In some examples, the quantity of resources includes resources used within the cell, resources used within a synchronization signal block area, resources used within a network slice, resources used for multiple-input multiple-output communications, resources used for guaranteed bit rate communications, or any combination thereof.

In some examples, to support receiving the signaling, the backoff information manager 740 may be configured as or otherwise support a means for receiving, via the signaling, an indication of a first time at which the adjusted backoff power level and the estimated level of interference associated with the adjusted backoff power level will be applied.

In some examples, the frequency band margin manager 765 may be configured as or otherwise support a means for receiving a request to increase a frequency band margin between a first frequency band associated with first communications via a first cell supported by the first network entity and a second frequency band associated with second communications via the cell supported by the second network entity. In some examples, the frequency band margin manager 765 may be configured as or otherwise support a means for scheduling the second communications within the second frequency band at least a threshold margin from the first frequency band based on the request.

In some examples, the interference report manager 750 may be configured as or otherwise support a means for transmitting a control message that indicates a backoff report configuration for reporting changes in the downlink interference measurements at the UE based on a backoff power level adjustment at the first network entity, the control message may indicate a time instance at which the adjusted backoff power level will be applied. In some examples, the interference report manager 750 may be configured as or otherwise support a means for the at least one interference report indicates a difference between a first level of downlink interference measured by the UE prior to the time instance and a second level of downlink interference measured by the UE after the time instance. In some examples, the interference report manager 750 may be configured as or otherwise support a means for transmitting the first feedback message is based on the difference.

Figure 8:
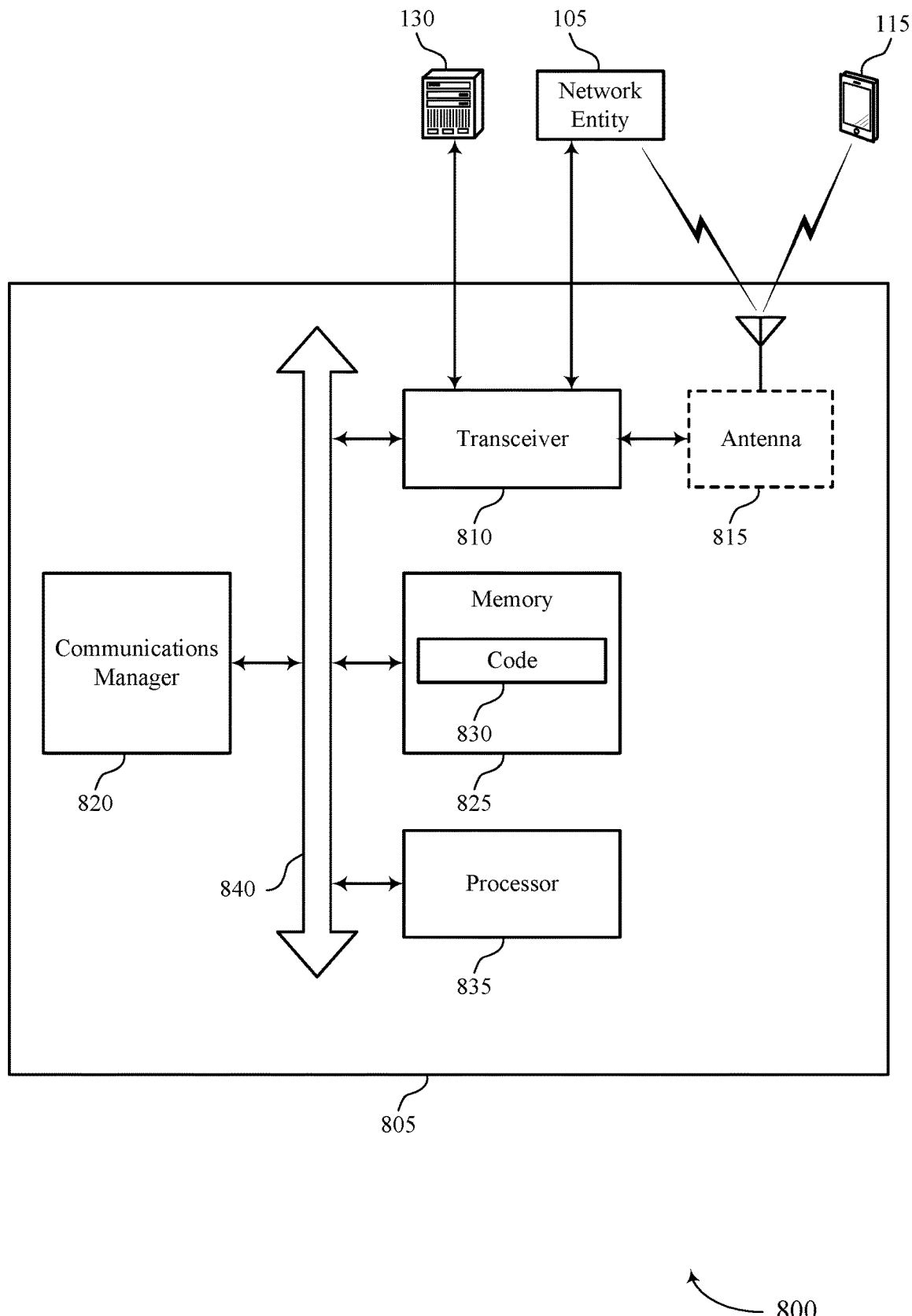
FIG. 8 shows a diagram of a system including a device that supports network entity backoff power adaptation for wireless communications in accordance with one or more aspects of the present disclosure.

FIG. 8 shows a diagram of a system 800 including a device 805 that supports network entity backoff power adaptation for wireless communications in accordance with one or more aspects of the present disclosure. The device 805 may be an example of or include the components of a device 505, a device 605, or a network entity 105 as described herein. The device 805 may communicate with one or more network entities 105, one or more UEs 115, or any combination thereof, which may include communications over one or more wired interfaces, over one or more wireless interfaces, or any combination thereof. The device 805 may include components that support outputting and obtaining communications, such as a communications manager 820, a transceiver 810, an antenna 815, a memory 825, code 830, and a processor 835. These components may be in electronic communication or otherwise coupled (e.g., operatively, communicatively, functionally, electronically, electrically) via one or more buses (e.g., a bus 840).

The transceiver 810 may support bi-directional communications via wired links, wireless links, or both as described herein. In some examples, the transceiver 810 may include a wired transceiver and may communicate bi-directionally with another wired transceiver. Additionally, or alternatively, in some examples, the transceiver 810 may include a wireless transceiver and may communicate bi-directionally with another wireless transceiver. In some examples, the device 805 may include one or more antennas 815, which may be capable of transmitting or receiving wireless transmissions (e.g., concurrently). The transceiver 810 may also include a modem (not shown) to modulate signals, to provide the modulated signals for transmission (e.g., by one or more antennas 815, by a wired transmitter), to receive modulated signals (e.g., from one or more antennas 815, from a wired receiver), and to demodulate signals. In some implementations, the transceiver 810 may include one or more interfaces, such as one or more interfaces coupled with the one or more antennas 815 that are configured to support various receiving or obtaining operations, or one or more interfaces coupled with the one or more antennas 815 that are configured to support various transmitting or outputting operations, or a combination thereof. In some implementations, the transceiver 810 may include or be configured for coupling with one or more processors or memory components that are operable to perform or support operations based on received or obtained information or signals, or to generate information or other signals for transmission or other outputting, or any combination thereof. In some implementations, the transceiver 810, or the transceiver 810 and the one or more antennas 815, or the transceiver 810 and the one or more antennas 815 and one or more processors or memory components (for example, the processor 835, or the memory 825, or both), may be included in a chip or chip assembly that is installed in the device 805. In some examples, the transceiver may be operable to support communications via one or more communications links (e.g., a communication link 125, a backhaul communication link 120, a midhaul communication link 162, a fronthaul communication link 168).

The memory 825 may include RAM and ROM. The memory 825 may store computer-readable, computer-executable code 830 including instructions that, when executed by the processor 835, cause the device 805 to perform various functions described herein. The code 830 may be stored in a non-transitory computer-readable medium such as system memory or another type of memory. In some cases, the code 830 may not be directly executable by the processor 835 but may cause a computer (e.g., when compiled and executed) to perform functions described herein. In some cases, the memory 825 may contain, among other things, a BIOS which may control basic hardware or software operation such as the interaction with peripheral components or devices.

The processor 835 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 835 may be configured to operate a memory array using a memory controller. In some other cases, a memory controller may be integrated into the processor 835. The processor 835 may be configured to execute computer-readable instructions stored in a memory (e.g., the memory 825) to cause the device 805 to perform various functions (e.g., functions or tasks supporting network entity backoff power adaptation for wireless communications). For example, the device 805 or a component of the device 805 may include a processor 835 and memory 825 coupled with the processor 835, the processor 835 and memory 825 configured to perform various functions described herein.

The processor 835 may be an example of a cloud-computing platform (e.g., one or more physical nodes and supporting software such as operating systems, virtual machines, or container instances) that may host the functions (e.g., by executing code 830) to perform the functions of the device 805. The processor 835 may be any one or more suitable processors capable of executing scripts or instructions of one or more software programs stored in the device 805 (such as within the memory 825). In some implementations, the processor 835 may be a component of a processing system. A processing system may generally refer to a system or series of machines or components that receives inputs and processes the inputs to produce a set of outputs (which may be passed to other systems or components of, for example, the device 805). For example, a processing system of the device 805 may refer to a system including the various other components or subcomponents of the device 805, such as the processor 835, or the transceiver 810, or the communications manager 820, or other components or combinations of components of the device 805.

The processing system of the device 805 may interface with other components of the device 805, and may process information received from other components (such as inputs or signals) or output information to other components. For example, a chip or modem of the device 805 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 805 may transmit information output from the chip or modem. Additionally, or alternatively, in some implementations, the one or more interfaces may refer to an interface between the processing system of the chip or modem and a receiver, such that the device 805 may obtain information or signal inputs, and the information may be passed to the processing system. A person having ordinary skill in the art will readily recognize that a first interface also may obtain information or signal inputs, and a second interface also may output information or signal outputs.

In some examples, a bus 840 may support communications of (e.g., within) a protocol layer of a protocol stack. In some examples, a bus 840 may support communications associated with a logical channel of a protocol stack (e.g., between protocol layers of a protocol stack), which may include communications performed within a component of the device 805, or between different components of the device 805 that may be co-located or located in different locations (e.g., where the device 805 may refer to a system in which one or more of the communications manager 820, the transceiver 810, the memory 825, the code 830, and the processor 835 may be located in one of the different components or divided between different components).

In some examples, the communications manager 820 may manage aspects of communications with a core network 130 (e.g., via one or more wired or wireless backhaul links). For example, the communications manager 820 may manage the transfer of data communications for client devices, such as one or more UEs 115. In some examples, the communications manager 820 may manage communications with other network entities 105, and may include a controller or scheduler for controlling communications with UEs 115 in cooperation with other network entities 105. In some examples, the communications manager 820 may support an X2 interface within an LTE/LTE-A wireless communications network technology to provide communication between network entities 105.

The communications manager 820 may support wireless communication at a first network entity in accordance with examples as disclosed herein. For example, the communications manager 820 may be configured as or otherwise support a means for adjusting a backoff power level for communications by the first network entity in a first cell. The communications manager 820 may be configured as or otherwise support a means for transmitting signaling that indicates an estimated level of interference in a second cell supported by a second network entity, the estimated level of interference based on the adjusted backoff power level for the communications by the first network entity in the first cell. The communications manager 820 may be configured as or otherwise support a means for receiving, based on the estimated level of interference, a first feedback message that indicates downlink interference measurements by at least one UE of a set of UEs in the second cell, where the downlink interference measurements are based on the adjusted backoff power level.

Additionally, or alternatively, the communications manager 820 may support wireless communication at a second network entity in accordance with examples as disclosed herein. For example, the communications manager 820 may be configured as or otherwise support a means for receiving signaling that indicates an estimated level of interference in a cell supported by the second network entity, the estimated level of interference based on an adjusted backoff power level at a first network entity. The communications manager 820 may be configured as or otherwise support a means for receiving at least one interference report that indicates downlink interference measurements by a UE of a set of UEs in the cell. The communications manager 820 may be configured as or otherwise support a means for transmitting, based on the estimated level of interference and the at least one interference report, a first feedback message that indicates the downlink interference measurements, where the downlink interference measurements are based on the adjusted backoff power level.

By including or configuring the communications manager 820 in accordance with examples as described herein, the device 805 may support techniques for backoff power adaptation with reduced power consumption, improved coordination between devices, and more efficient utilization of communication resources.

In some examples, the communications manager 820 may be configured to perform various operations (e.g., receiving, obtaining, monitoring, outputting, transmitting) using or otherwise in cooperation with the transceiver 810, the one or more antennas 815 (e.g., where applicable), or any combination thereof. Although the communications manager 820 is illustrated as a separate component, in some examples, one or more functions described with reference to the communications manager 820 may be supported by or performed by the transceiver 810, the processor 835, the memory 825, the code 830, or any combination thereof. For example, the code 830 may include instructions executable by the processor 835 to cause the device 805 to perform various aspects of network entity backoff power adaptation for wireless communications as described herein, or the processor 835 and the memory 825 may be otherwise configured to perform or support such operations.

Figure 9:
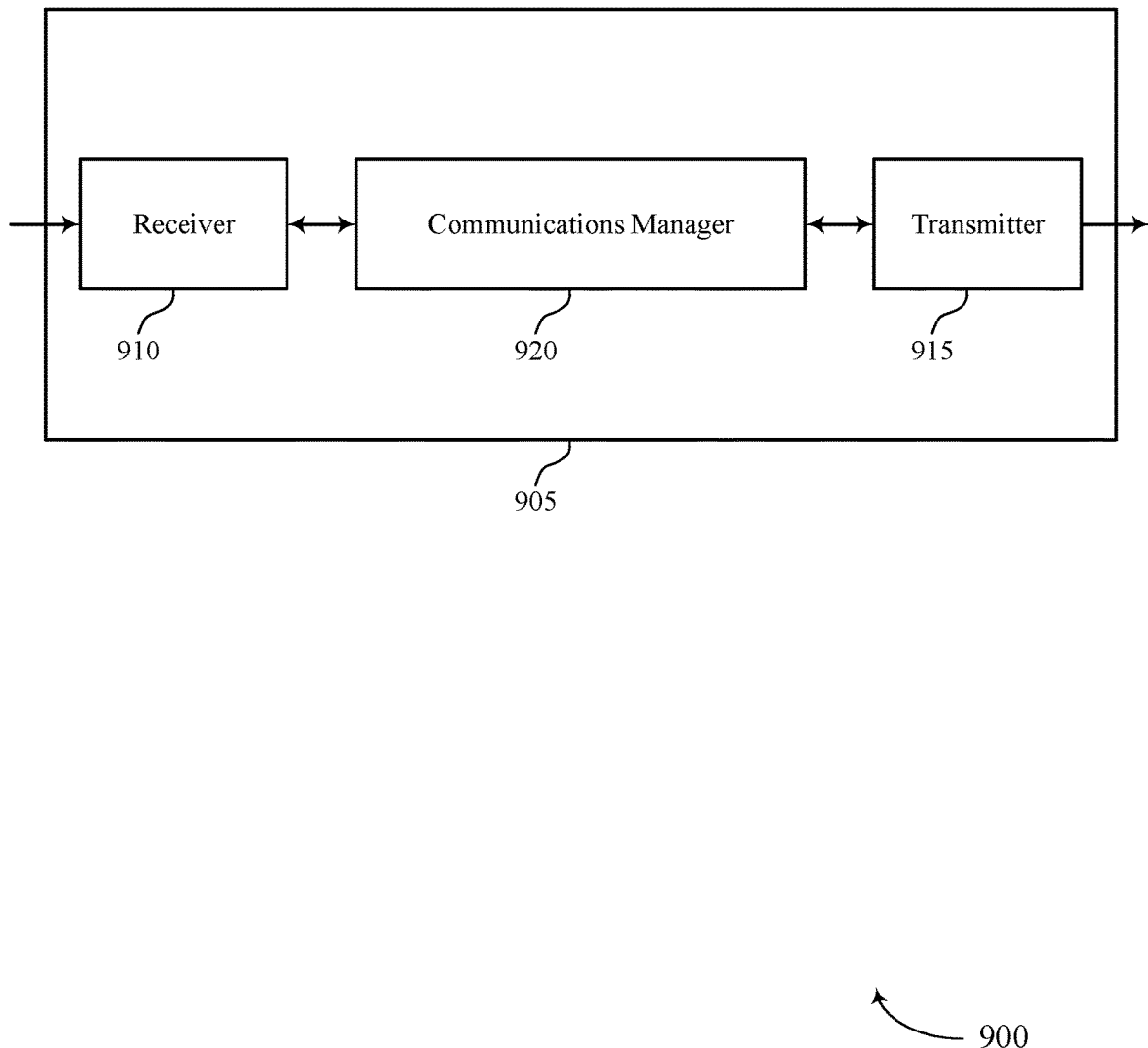
FIGS. 9 and 10 show block diagrams of devices that support network entity backoff power adaptation for wireless communications in accordance with one or more aspects of the present disclosure.

FIG. 9 shows a block diagram 900 of a device 905 that supports network entity backoff power adaptation for wireless communications in accordance with one or more aspects of the present disclosure. The device 905 may be an example of aspects of a UE 115 as described herein. The device 905 may include a receiver 910, a transmitter 915, and a communications manager 920. The device 905 may also include a processor (not shown). Each of these components may be in communication with one another (e.g., via one or more buses).

The receiver 910 may provide a means for receiving information such as packets, user data, control information, or any combination thereof associated with various information channels (e.g., control channels, data channels, information channels related to network entity backoff power adaptation for wireless communications). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to network entity backoff power adaptation for wireless communications). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of network entity backoff power adaptation for wireless communications as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a UE in accordance with examples as disclosed herein. For example, the communications manager 920 may be configured as or otherwise support a means for measuring a first level of downlink interference at the UE, the downlink interference associated with communications by the UE in a second cell. The communications manager 920 may be configured as or otherwise support a means for receiving a control message that indicates a backoff report configuration for reporting changes in the downlink interference at the UE based on an adjustment of a backoff power level for communications in a first cell. The communications manager 920 may be configured as or otherwise support a means for transmitting, based on the backoff report configuration, an interference report that indicates a second level of the downlink interference measured at the UE for at least a time period, the second level greater than the first level by at least a threshold, where the downlink interference increasing to the second level for the time period is based on the adjustment of the backoff power level in the first cell.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for backoff power adaptation with reduced power consumption, improved coordination between devices, and more efficient utilization of resources.

Figure 10:
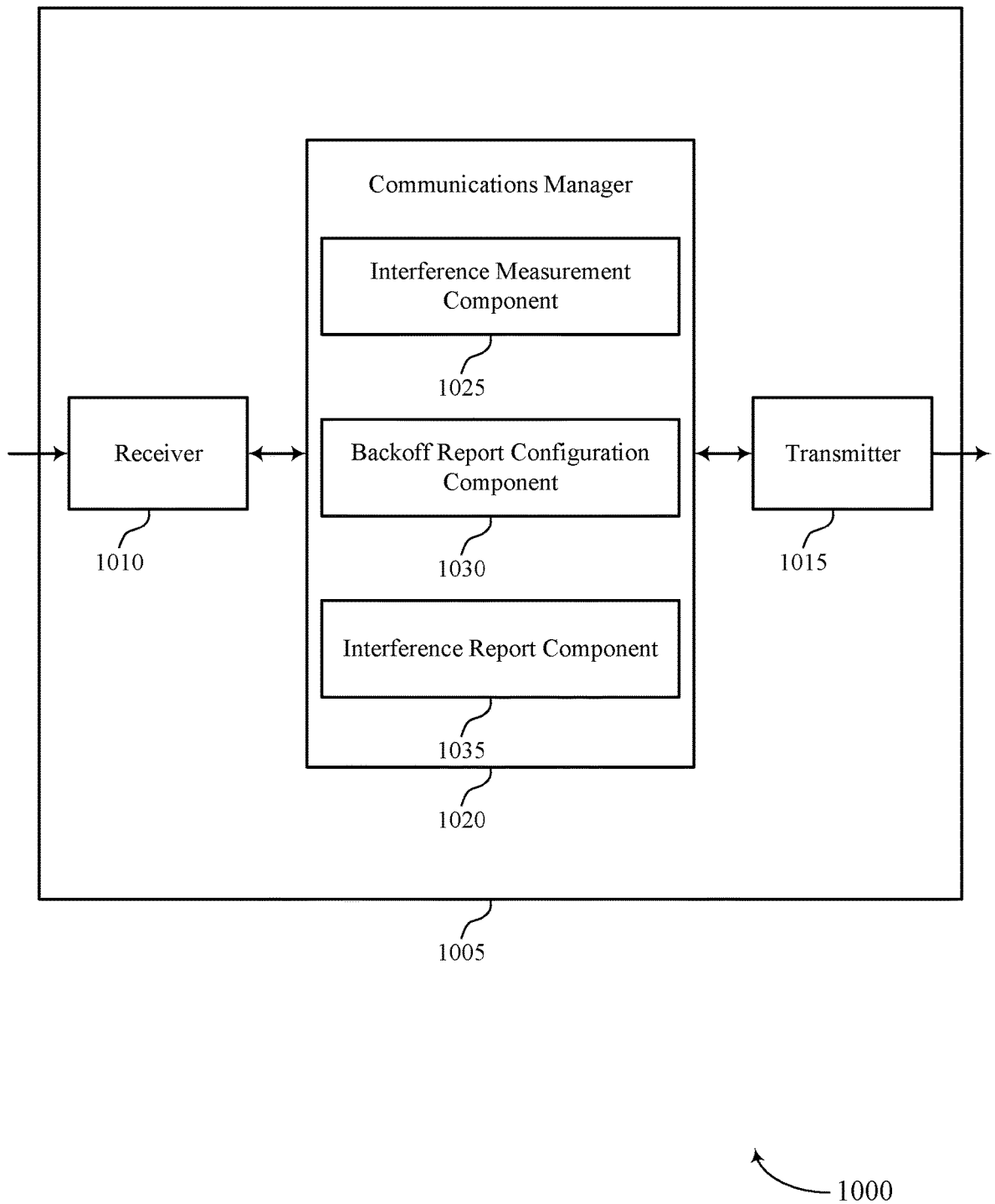

FIG. 10 shows a block diagram 1000 of a device 1005 that supports network entity backoff power adaptation for wireless communications in accordance with one or more aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor (not shown). Each of these components may be in communication with one another (e.g., via one or more buses).

The receiver 1010 may provide a means for receiving information such as packets, user data, control information, or any combination thereof associated with various information channels (e.g., control channels, data channels, information channels related to network entity backoff power adaptation for wireless communications). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to network entity backoff power adaptation for wireless communications). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of network entity backoff power adaptation for wireless communications as described herein. For example, the communications manager 1020 may include an interference measurement component 1025, a backoff report configuration component 1030, an interference report component 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a UE in accordance with examples as disclosed herein. The interference measurement component 1025 may be configured as or otherwise support a means for measuring a first level of downlink interference at the UE, the downlink interference associated with communications by the UE in a second cell. The backoff report configuration component 1030 may be configured as or otherwise support a means for receiving a control message that indicates a backoff report configuration for reporting changes in the downlink interference at the UE based on an adjustment of a backoff power level for communications in a first cell. The interference report component 1035 may be configured as or otherwise support a means for transmitting, based on the backoff report configuration, an interference report that indicates a second level of the downlink interference measured at the UE for at least a time period, the second level greater than the first level by at least a threshold, where the downlink interference increasing to the second level for the time period is based on the adjustment of the backoff power level in the first cell.

Figure 11:
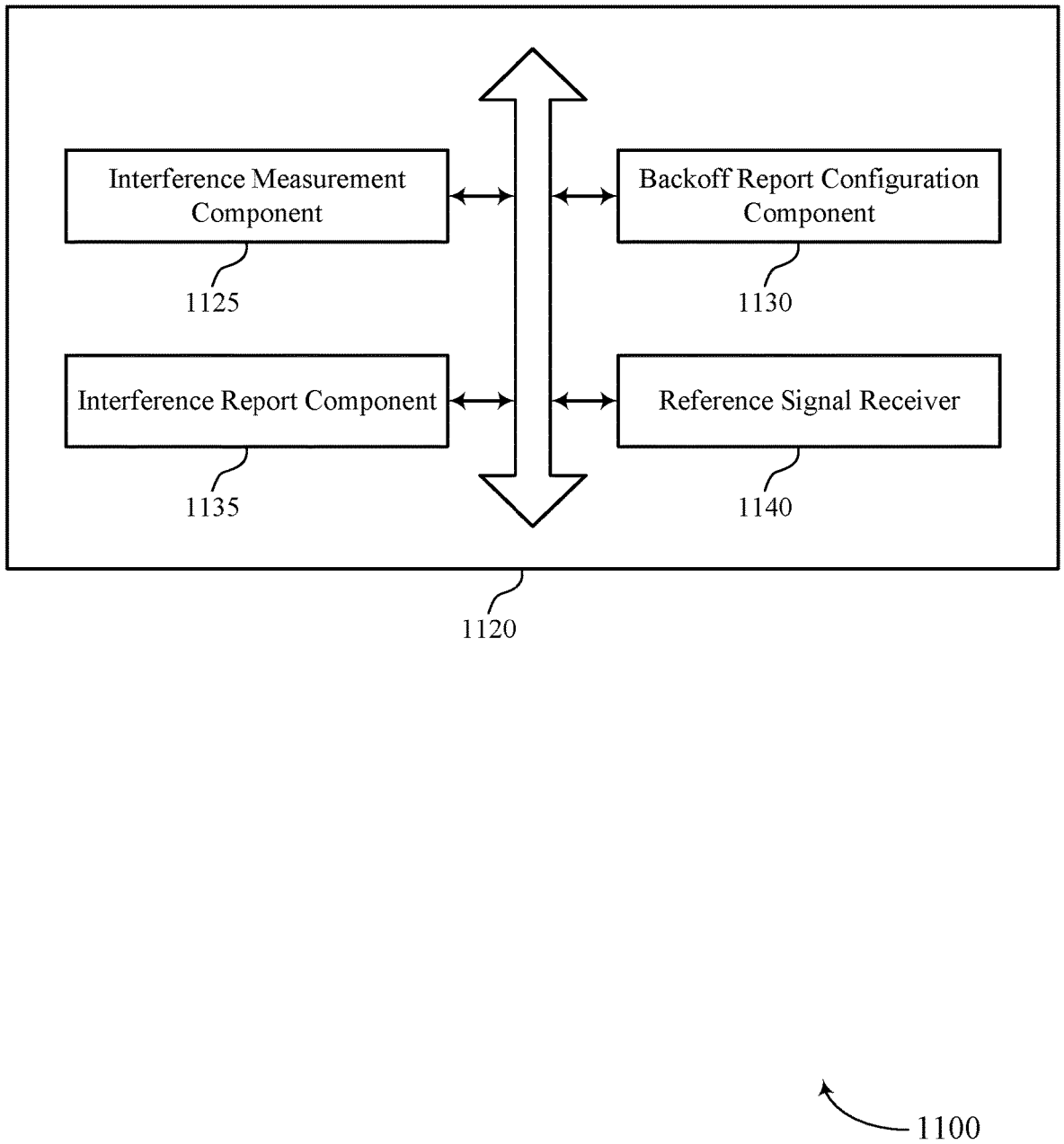
FIG. 11 shows a block diagram of a communications manager that supports network entity backoff power adaptation for wireless communications in accordance with one or more aspects of the present disclosure.

FIG. 11 shows a block diagram 1100 of a communications manager 1120 that supports network entity backoff power adaptation for wireless communications in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of network entity backoff power adaptation for wireless communications as described herein. For example, the communications manager 1120 may include an interference measurement component 1125, a backoff report configuration component 1130, an interference report component 1135, a reference signal receiver 1140, or any combination thereof. Each of these components may communicate, directly or indirectly, with one another (e.g., via one or more buses).

The communications manager 1120 may support wireless communication at a UE in accordance with examples as disclosed herein. The interference measurement component 1125 may be configured as or otherwise support a means for measuring a first level of downlink interference at the UE, the downlink interference associated with communications by the UE in a second cell. The backoff report configuration component 1130 may be configured as or otherwise support a means for receiving a control message that indicates a backoff report configuration for reporting changes in the downlink interference at the UE based on an adjustment of a backoff power level for communications in a first cell. The interference report component 1135 may be configured as or otherwise support a means for transmitting, based on the backoff report configuration, an interference report that indicates a second level of the downlink interference measured at the UE for at least a time period, the second level greater than the first level by at least a threshold, where the downlink interference increasing to the second level for the time period is based on the adjustment of the backoff power level in the first cell.

In some examples, the interference measurement component 1125 may be configured as or otherwise support a means for determining a difference between the second level of the downlink interference and the first level of the downlink interference, where the interference report indicates the difference.

In some examples, the interference measurement component 1125 may be configured as or otherwise support a means for comparing the difference with the threshold, where the interference report indicates that the difference is greater than the threshold.

In some examples, the reference signal receiver 1140 may be configured as or otherwise support a means for receiving, prior to a time instance associated with the adjustment of the backoff power level in the first cell, a first set of multiple channel state information reference signals, where measuring the first level of the downlink interference is based on the first set of multiple channel state information reference signals. In some examples, the reference signal receiver 1140 may be configured as or otherwise support a means for receiving, after the time instance, a second set of multiple channel state information reference signals, where the control message indicates the time instance. In some examples, the interference measurement component 1125 may be configured as or otherwise support a means for measuring the second level of the downlink interference based on the second set of multiple channel state information reference signals.

In some examples, to support receiving the control message, the backoff report configuration component 1130 may be configured as or otherwise support a means for receiving, via the control message, an indication of the threshold, the time period, and a time instance at which an adjusted backoff power level in the first cell will be applied.

Figure 12:
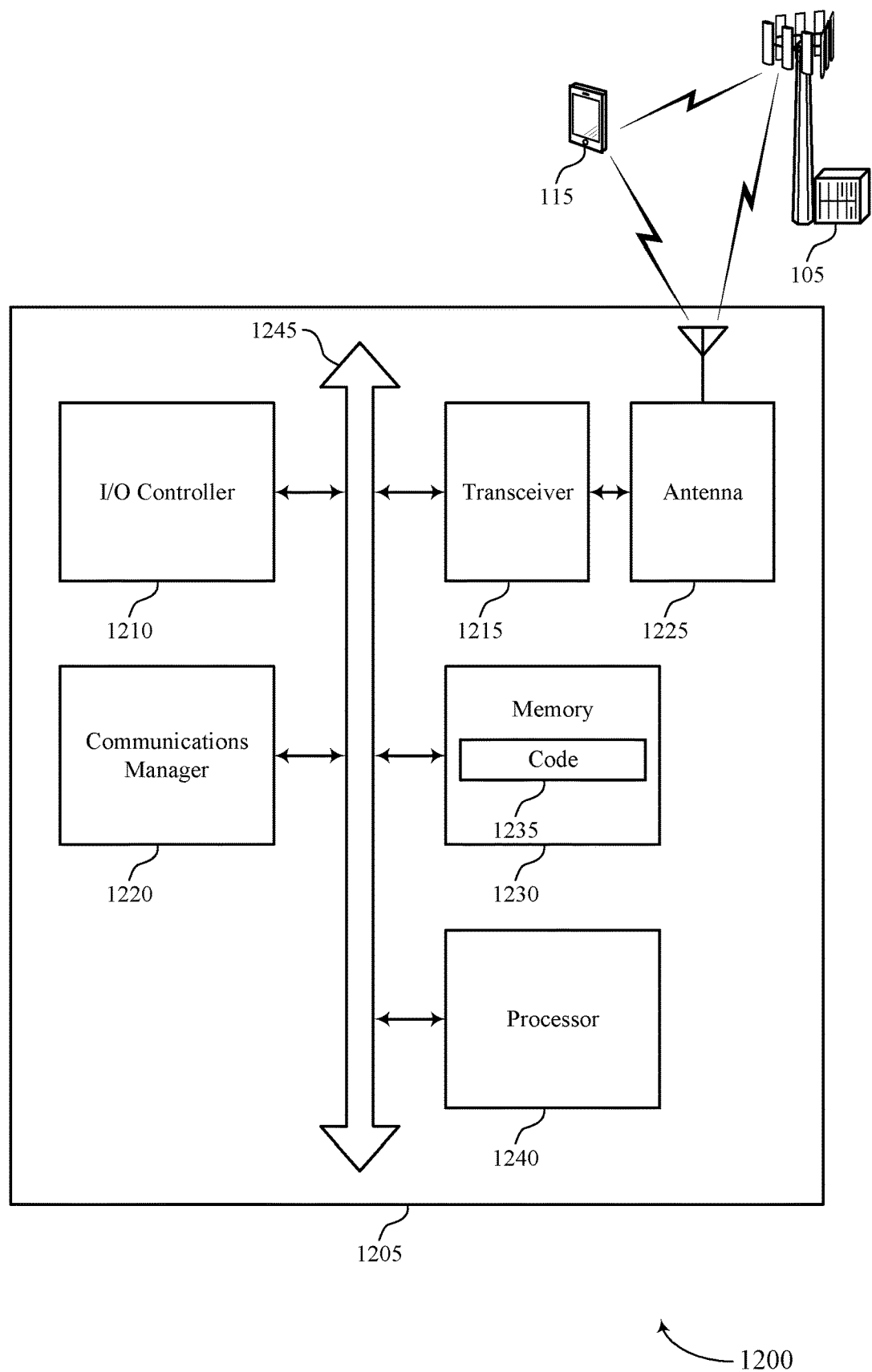
FIG. 12 shows a diagram of a system including a device that supports network entity backoff power adaptation for wireless communications in accordance with one or more aspects of the present disclosure.

FIG. 12 shows a diagram of a system 1200 including a device 1205 that supports network entity backoff power adaptation for wireless communications in accordance with one or more aspects of the present disclosure. The device 1205 may be an example of or include the components of a device 905, a device 1005, or a UE 115 as described herein. The device 1205 may communicate (e.g., wirelessly) with one or more network entities 105, one or more UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally, or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem (not shown) to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting network entity backoff power adaptation for wireless communications). For example, the device 1205 or a component of the device 1205 may include a processor 1240 and memory 1230 coupled with or to the processor 1240, the processor 1240 and memory 1230 configured to perform various functions described herein.

The communications manager 1220 may support wireless communication at a UE in accordance with examples as disclosed herein. For example, the communications manager 1220 may be configured as or otherwise support a means for measuring a first level of downlink interference at the UE, the downlink interference associated with communications by the UE in a second cell. The communications manager 1220 may be configured as or otherwise support a means for receiving a control message that indicates a backoff report configuration for reporting changes in the downlink interference at the UE based on an adjustment of a backoff power level for communications in a first cell. The communications manager 1220 may be configured as or otherwise support a means for transmitting, based on the backoff report configuration, an interference report that indicates a second level of the downlink interference measured at the UE for at least a time period, the second level greater than the first level by at least a threshold, where the downlink interference increasing to the second level for the time period is based on the adjustment of the backoff power level in the first cell.

By including or configuring the communications manager 1220 in accordance with examples as described herein, the device 1205 may support techniques for backoff power adaptation with reduced power consumption, improved coordination between devices, and more efficient utilization of communication resources.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of network entity backoff power adaptation for wireless communications as described herein, or the processor 1240 and the memory 1230 may be otherwise configured to perform or support such operations.

Figure 13:
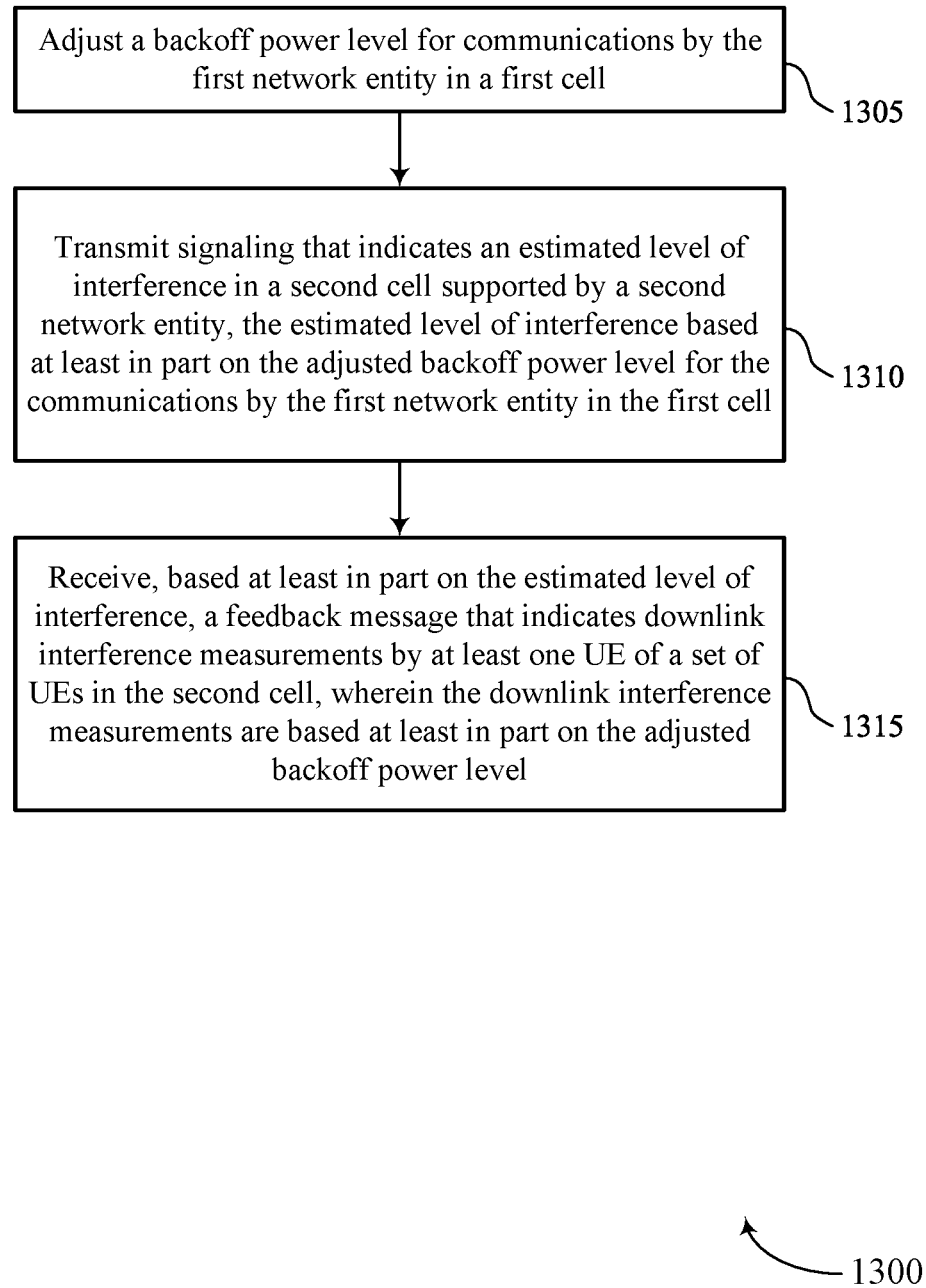
FIGS. 13 through 18 show flowcharts illustrating methods that support network entity backoff power adaptation for wireless communications in accordance with one or more aspects of the present disclosure.

FIG. 13 shows a flowchart illustrating a method 1300 that supports network entity backoff power adaptation for wireless communications in accordance with one or more aspects of the present disclosure. The operations of the method 1300 may be implemented by a network entity or its components as described herein. For example, the operations of the method 1300 may be performed by a network entity as described herein with reference to FIGS. 1 through 8. In some examples, a network entity may execute a set of instructions to control the functional elements of the network entity to perform the described functions. Additionally, or alternatively, the network entity may perform aspects of the described functions using special-purpose hardware.

At 1305, the method may include adjusting a backoff power level for communications by the first network entity in a first cell. The operations of 1305 may be performed in accordance with examples as disclosed herein. In some examples, aspects of the operations of 1305 may be performed by a backoff power level manager 725 as described herein with reference to FIG. 7.

At 1310, the method may include transmitting signaling that indicates an estimated level of interference in a second cell supported by a second network entity, the estimated level of interference based at least in part on the adjusted backoff power level for the communications by the first network entity in the first cell. The operations of 1310 may be performed in accordance with examples as disclosed herein. In some examples, aspects of the operations of 1310 may be performed by a backoff interference reporting manager 730 as described herein with reference to FIG. 7.

At 1315, the method may include receiving, based at least in part on the estimated level of interference, a first feedback message that indicates downlink interference measurements by at least one UE of a set of UEs in the second cell, where the downlink interference measurements are based at least in part on the adjusted backoff power level. The operations of 1315 may be performed in accordance with examples as disclosed herein. In some examples, aspects of the operations of 1315 may be performed by a feedback manager 735 as described herein with reference to FIG. 7.

Figure 14:
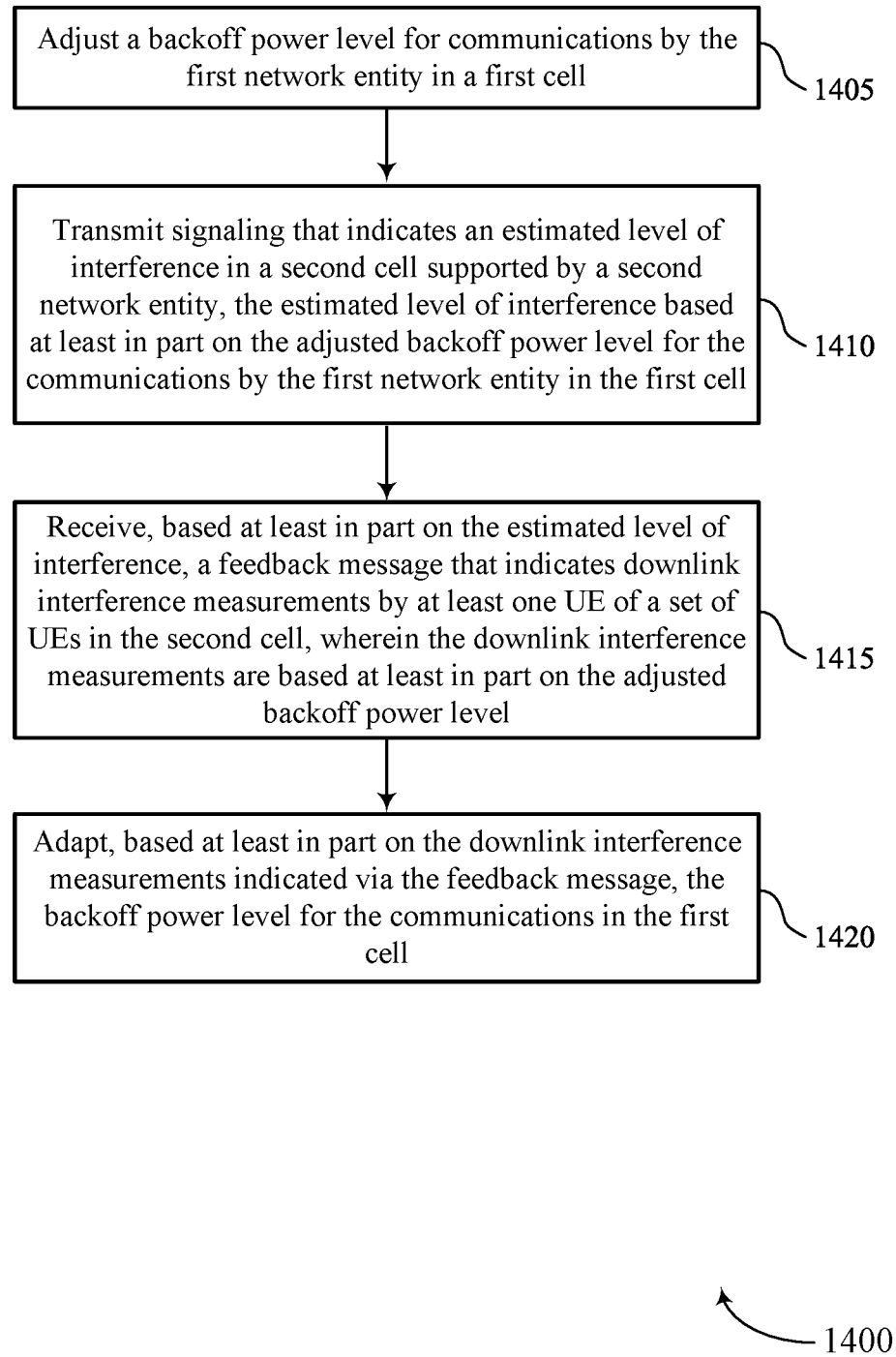

FIG. 14 shows a flowchart illustrating a method 1400 that supports network entity backoff power adaptation for wireless communications in accordance with one or more aspects of the present disclosure. The operations of the method 1400 may be implemented by a network entity or its components as described herein. For example, the operations of the method 1400 may be performed by a network entity as described herein with reference to FIGS. 1 through 8. In some examples, a network entity may execute a set of instructions to control the functional elements of the network entity to perform the described functions. Additionally, or alternatively, the network entity may perform aspects of the described functions using special-purpose hardware.

At 1405, the method may include adjusting a backoff power level for communications by the first network entity in a first cell. The operations of 1405 may be performed in accordance with examples as disclosed herein. In some examples, aspects of the operations of 1405 may be performed by a backoff power level manager 725 as described herein with reference to FIG. 7.

At 1410, the method may include transmitting signaling that indicates an estimated level of interference in a second cell supported by a second network entity, the estimated level of interference based at least in part on the adjusted backoff power level for the communications by the first network entity in the first cell. The operations of 1410 may be performed in accordance with examples as disclosed herein. In some examples, aspects of the operations of 1410 may be performed by a backoff interference reporting manager 730 as described herein with reference to FIG. 7.

At 1415, the method may include receiving, based at least in part on the estimated level of interference, a first feedback message that indicates downlink interference measurements by at least one UE of a set of UEs in the second cell, wherein the downlink interference measurements are based at least in part on the adjusted backoff power level. The operations of 1415 may be performed in accordance with examples as disclosed herein. In some examples, aspects of the operations of 1415 may be performed by a feedback manager 735 as described herein with reference to FIG. 7.

At 1420, the method may include adapting, based at least in part on the downlink interference measurements indicated via the first feedback message, the backoff power level for the communications in the first cell. The operations of 1420 may be performed in accordance with examples as disclosed herein. In some examples, aspects of the operations of 1420 may be performed by a backoff power level manager 725 as described herein with reference to FIG. 7.

Figure 15:
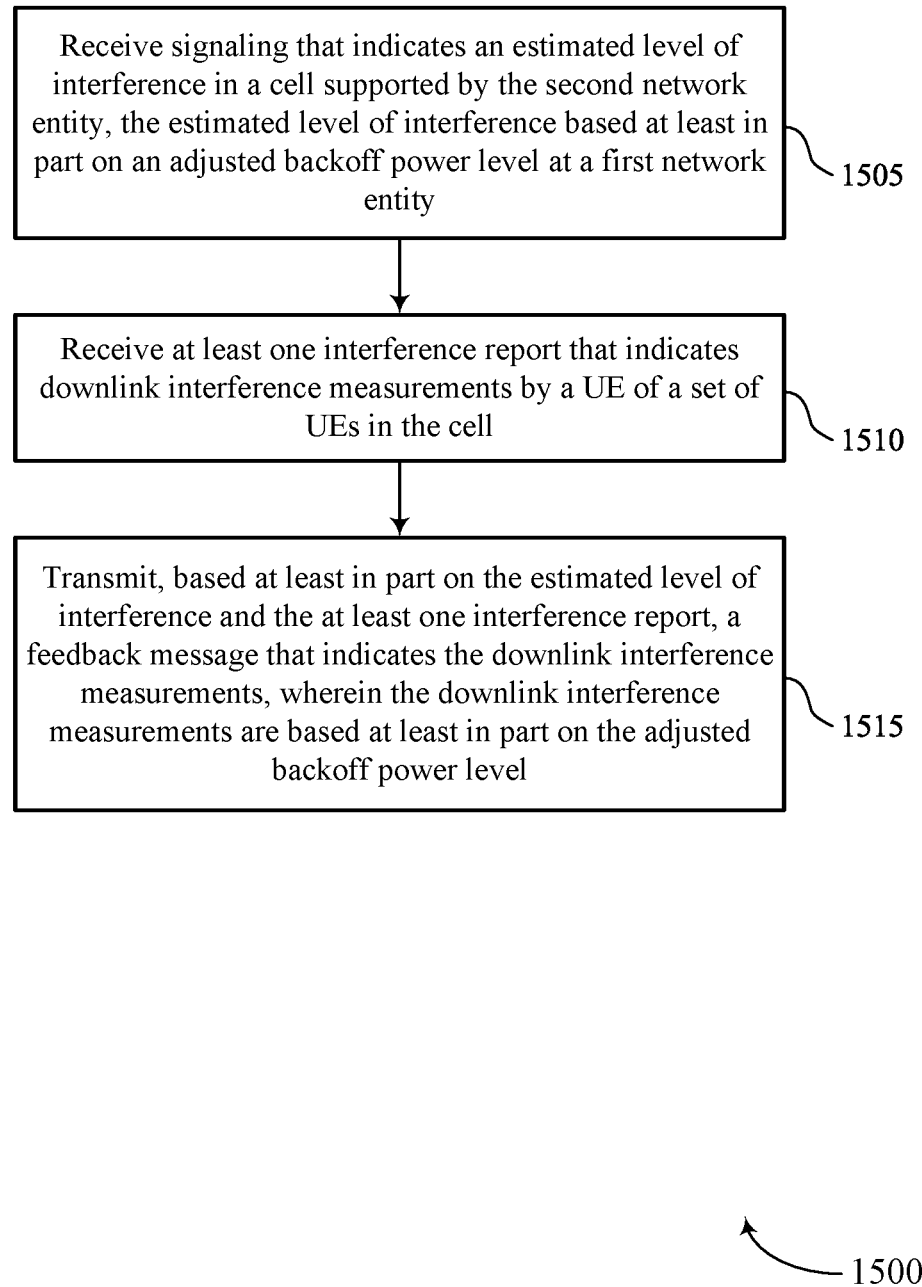

FIG. 15 shows a flowchart illustrating a method 1500 that supports network entity backoff power adaptation for wireless communications in accordance with one or more aspects of the present disclosure. The operations of the method 1500 may be implemented by a network entity or its components as described herein. For example, the operations of the method 1500 may be performed by a network entity as described herein with reference to FIGS. 1 through 8. In some examples, a network entity may execute a set of instructions to control the functional elements of the network entity to perform the described functions. Additionally, or alternatively, the network entity may perform aspects of the described functions using special-purpose hardware.

At 1505, the method may include receiving signaling that indicates an estimated level of interference in a cell supported by the second network entity, the estimated level of interference based at least in part on an adjusted backoff power level at a first network entity. The operations of 1505 may be performed in accordance with examples as disclosed herein. In some examples, aspects of the operations of 1505 may be performed by a backoff information manager 740 as described herein with reference to FIG. 7.

At 1510, the method may include receiving at least one interference report that indicates downlink interference measurements by a UE of a set of UEs in the cell. The operations of 1510 may be performed in accordance with examples as disclosed herein. In some examples, aspects of the operations of 1510 may be performed by an interference information manager 745 as described herein with reference to FIG. 7.

At 1515, the method may include transmitting, based at least in part on the estimated level of interference and the at least one interference report, a first feedback message that indicates the downlink interference measurements, wherein the downlink interference measurements are based at least in part on the adjusted backoff power level. The operations of 1515 may be performed in accordance with examples as disclosed herein. In some examples, aspects of the operations of 1515 may be performed by an interference report manager 750 as described herein with reference to FIG. 7.

Figure 16:
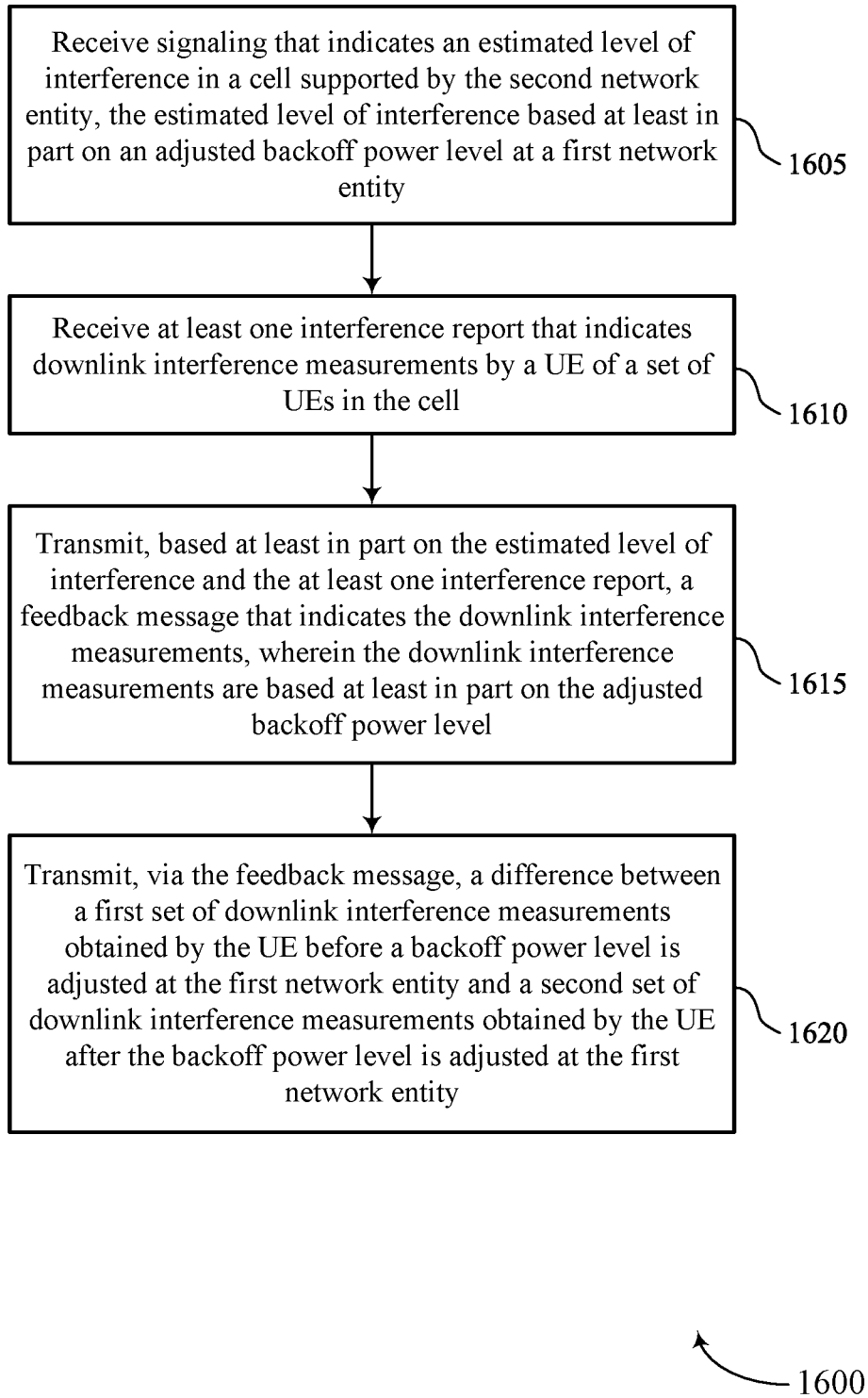

FIG. 16 shows a flowchart illustrating a method 1600 that supports network entity backoff power adaptation for wireless communications in accordance with one or more aspects of the present disclosure. The operations of the method 1600 may be implemented by a network entity or its components as described herein. For example, the operations of the method 1600 may be performed by a network entity as described herein with reference to FIGS. 1 through 8. In some examples, a network entity may execute a set of instructions to control the functional elements of the network entity to perform the described functions. Additionally, or alternatively, the network entity may perform aspects of the described functions using special-purpose hardware.

At 1605, the method may include receiving signaling that indicates an estimated level of interference in a cell supported by the second network entity, the estimated level of interference based at least in part on an adjusted backoff power level at a first network entity. The operations of 1605 may be performed in accordance with examples as disclosed herein. In some examples, aspects of the operations of 1605 may be performed by a backoff information manager 740 as described herein with reference to FIG. 7.

At 1610, the method may include receiving at least one interference report that indicates downlink interference measurements by a UE of a set of UEs in the cell. The operations of 1610 may be performed in accordance with examples as disclosed herein. In some examples, aspects of the operations of 1610 may be performed by an interference information manager 745 as described herein with reference to FIG. 7.

At 1615, the method may include transmitting, based at least in part on the estimated level of interference and the at least one interference report, a first feedback message that indicates the downlink interference measurements, wherein the downlink interference measurements are based at least in part on the adjusted backoff power level. The operations of 1615 may be performed in accordance with examples as disclosed herein. In some examples, aspects of the operations of 1615 may be performed by an interference report manager 750 as described herein with reference to FIG. 7.

At 1620, the method may include transmitting, via the first feedback message, a difference between a first set of downlink interference measurements obtained by the UE before a backoff power level is adjusted at the first network entity and a second set of downlink interference measurements obtained by the UE after the backoff power level is adjusted at the first network entity. The operations of 1620 may be performed in accordance with examples as disclosed herein. In some examples, aspects of the operations of 1620 may be performed by an interference report manager 750 as described herein with reference to FIG. 7.

Figure 17:
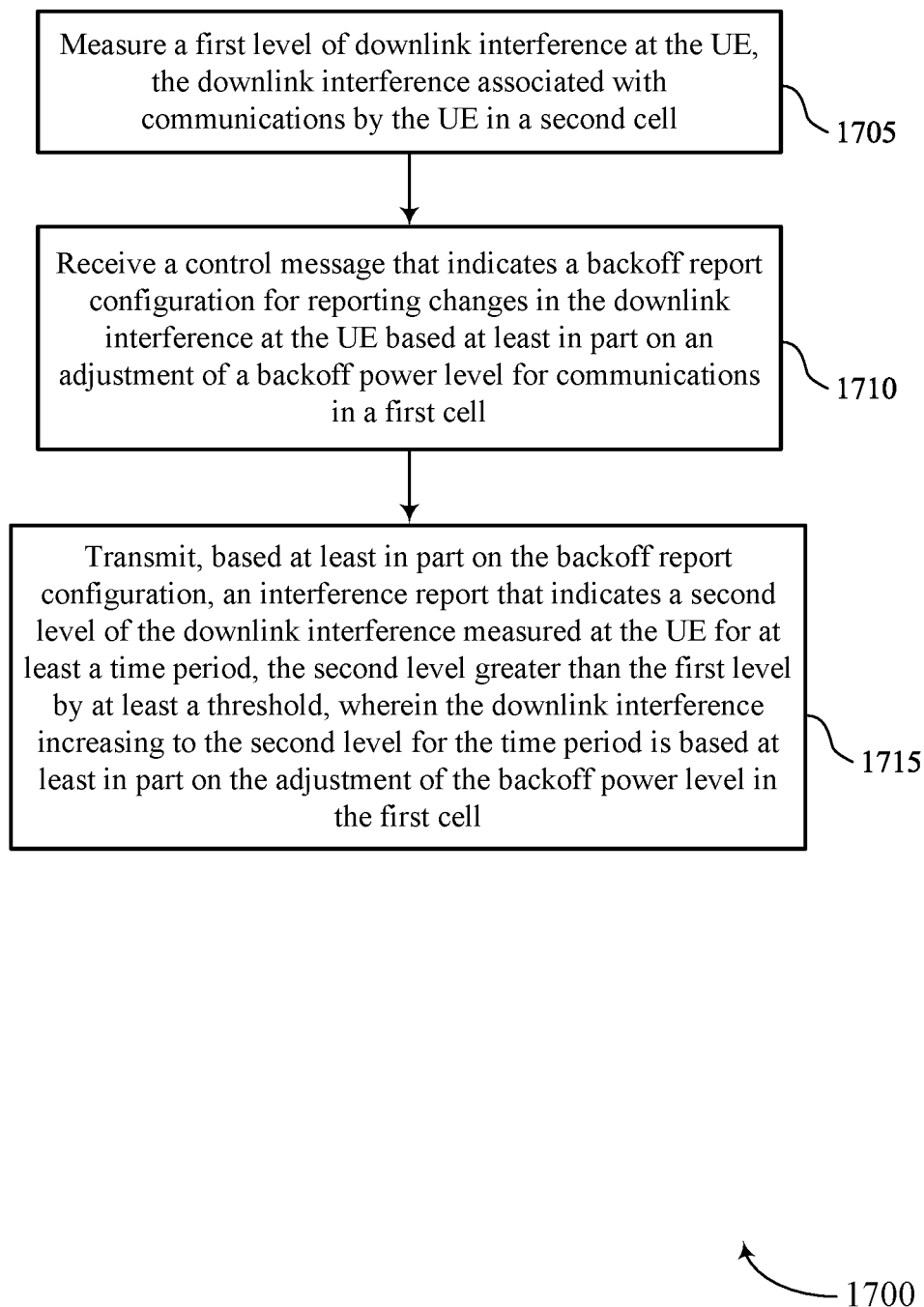

FIG. 17 shows a flowchart illustrating a method 1700 that supports network entity backoff power adaptation for wireless communications in accordance with one or more aspects of the present disclosure. The operations of the method 1700 may be implemented by a UE or its components as described herein. For example, the operations of the method 1700 may be performed by a UE 115 as described herein with reference to FIGS. 1 through 4 and 9 through 12. In some examples, a UE may execute a set of instructions to control the functional elements of the UE to perform the described functions. Additionally, or alternatively, the UE may perform aspects of the described functions using special-purpose hardware.

At 1705, the method may include measuring a first level of downlink interference at the UE, the downlink interference associated with communications by the UE in a second cell. The operations of 1705 may be performed in accordance with examples as disclosed herein. In some examples, aspects of the operations of 1705 may be performed by an interference measurement component 1125 as described herein with reference to FIG. 11.

At 1710, the method may include receiving a control message that indicates a backoff report configuration for reporting changes in the downlink interference at the UE based at least in part on an adjustment of a backoff power level for communications in a first cell. The operations of 1710 may be performed in accordance with examples as disclosed herein. In some examples, aspects of the operations of 1710 may be performed by a backoff report configuration component 1130 as described herein with reference to FIG. 11.

At 1715, the method may include transmitting, based at least in part on the backoff report configuration, an interference report that indicates a second level of the downlink interference measured at the UE for at least a time period, the second level greater than the first level by at least a threshold, wherein the downlink interference increasing to the second level for the time period is based at least in part on the adjustment of the backoff power level in the first cell. The operations of 1715 may be performed in accordance with examples as disclosed herein. In some examples, aspects of the operations of 1715 may be performed by an interference report component 1135 as described herein with reference to FIG. 11.

Figure 18:
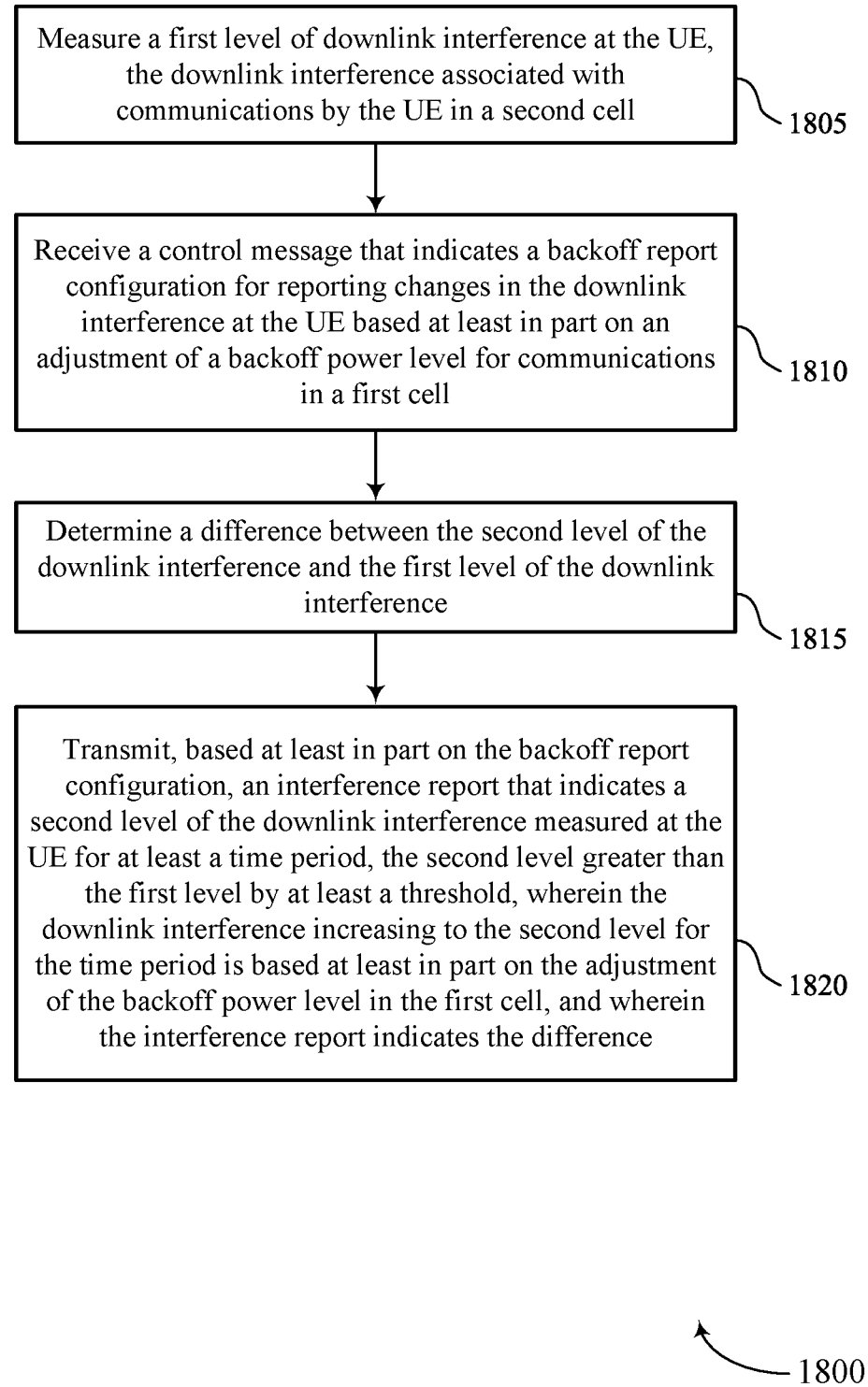

FIG. 18 shows a flowchart illustrating a method 1800 that supports network entity backoff power adaptation for wireless communications in accordance with one or more aspects of the present disclosure. The operations of the method 1800 may be implemented by a UE or its components as described herein. For example, the operations of the method 1800 may be performed by a UE 115 as described herein with reference to FIGS. 1 through 4 and 9 through 12. In some examples, a UE may execute a set of instructions to control the functional elements of the UE to perform the described functions. Additionally, or alternatively, the UE may perform aspects of the described functions using special-purpose hardware.

At 1805, the method may include measuring a first level of downlink interference at the UE, the downlink interference associated with communications by the UE in a second cell. The operations of 1805 may be performed in accordance with examples as disclosed herein. In some examples, aspects of the operations of 1805 may be performed by an interference measurement component 1125 as described herein with reference to FIG. 11.

At 1810, the method may include receiving a control message that indicates a backoff report configuration for reporting changes in the downlink interference at the UE based at least in part on an adjustment of a backoff power level for communications in a first cell. The operations of 1810 may be performed in accordance with examples as disclosed herein. In some examples, aspects of the operations of 1810 may be performed by a backoff report configuration component 1130 as described herein with reference to FIG. 11.

At 1815, the method may include determining a difference between the second level of the downlink interference and the first level of the downlink interference. The operations of 1815 may be performed in accordance with examples as disclosed herein. In some examples, aspects of the operations of 1815 may be performed by an interference measurement component 1125 as described herein with reference to FIG. 11.

At 1820, the method may include transmitting, based at least in part on the backoff report configuration, an interference report that indicates a second level of the downlink interference measured at the UE for at least a time period, the second level greater than the first level by at least a threshold, wherein the downlink interference increasing to the second level for the time period is based at least in part on the adjustment of the backoff power level in the first cell, and wherein the interference report indicates the difference. The operations of 1820 may be performed in accordance with examples as disclosed herein. In some examples, aspects of the operations of 1820 may be performed by an interference report component 1135 as described herein with reference to FIG. 11.

The following provides an overview of aspects of the present disclosure:

Aspect 1: A method for wireless communication at a first network entity, comprising: adjusting a backoff power level for communications by the first network entity in a first cell; transmitting signaling that indicates an estimated level of interference in a second cell supported by a second network entity, the estimated level of interference based at least in part on the adjusted backoff power level for the communications by the first network entity in the first cell; and receiving, based at least in part on the estimated level of interference, a feedback message that indicates downlink interference measurements by at least one UE of a set of UEs in the second cell, wherein the downlink interference measurements are based at least in part on the adjusted backoff power level.

Aspect 2: The method of aspect 1, further comprising: adapting, based at least in part on the downlink interference measurements indicated via the feedback message, the backoff power level for the communications in the first cell.

Aspect 3: The method of aspect 2, wherein the feedback message comprises a backoff adaptation command, and wherein adapting the backoff power level comprises: increasing or decreasing the adjusted backoff power level based at least in part on the backoff adaptation command.

Aspect 4: The method of any of aspects 2 through 3, wherein receiving the feedback message comprises: receiving, via the feedback message, a difference between a first set of downlink interference measurements obtained by the at least one UE before the backoff power level is adjusted and a second set of downlink interference measurements by the at least one UE after the backoff power level is adjusted, wherein adapting the backoff power level is based at least in part on the difference being greater than a threshold.

Aspect 5: The method of any of aspects 2 through 4, wherein the downlink interference measurements are associated with a second frequency band, the second frequency band associated with communications via the second cell; and the feedback message further indicates additional downlink interference measurements by the at least one UE of the set of UEs in a third frequency band adjacent to the second frequency band, the adapting the backoff power level based at least in part on the additional downlink interference measurements.

Aspect 6: The method of any of aspects 1 through 5, further comprising: receiving a resource status response message that initiates a backoff adaptation procedure, wherein adjusting the backoff power level is based at least in part on the received resource status response message.

Aspect 7: The method of aspect 6, wherein the resource status response message indicates that a quantity of resources used for communications in the second cell is less than a threshold quantity.

Aspect 8: The method of any of aspects 6 through 7, further comprising: transmitting a resource status request message to initiate the backoff adaptation procedure, wherein receiving the resource status response message is based at least in part on the resource status request message.

Aspect 9: The method of any of aspects 1 through 8, further comprising: comparing a first quantity of resources used for the communications in the first cell, a second quantity of resources used for second communications in the second cell, or both with a threshold quantity, wherein adjusting the backoff power level is based at least in part on one or both of the first quantity or the second quantity being less than the threshold quantity.

Aspect 10: The method of aspect 9, wherein the first quantity and the second quantity correspond to a quantity of physical resource blocks, a quantity of downlink control channel elements, or both; the first quantity and the second quantity comprise resources associated with a respective cell, resources associated with a synchronization signal block area, resources associated with a network slice, resources associated with multiple-input multiple-output communications, resources associated with guaranteed bit rate communications, or any combination thereof; and the threshold quantity is based at least in part on a type of resource usage.

Aspect 11: The method of any of aspects 1 through 10, further comprising: determining, based at least in part on an interference estimation procedure, a plurality of estimated levels of interference in the second cell, each estimated level of interference associated with a respective backoff power level of a plurality of backoff power levels at the first network entity; and selecting the estimated level of interference from the plurality of estimated levels of interference based at least in part on the adjusted backoff power level.

Aspect 12: The method of any of aspects 1 through 11, wherein transmitting the signaling comprises: transmitting, via the signaling, an indication of a first time at which the adjusted backoff power level and the estimated level of interference associated with the adjusted backoff power level will be applied.

Aspect 13: The method of any of aspects 1 through 12, further comprising: transmitting, based at least in part on the adjusted backoff power level and the estimated level of interference, a request for the second network entity to increase a frequency band margin between a first frequency band associated with the communications via the first cell and a second frequency band associated with second communications via the second cell.

Aspect 14: The method of any of aspects 1 through 13, wherein the first cell is associated with a first frequency band; the second cell is associated with a second frequency band; and the estimated level of interference corresponds to an estimated adjacent channel leakage ratio in the second frequency band based at least in part on the communications in the first frequency band.

Aspect 15: A method for wireless communication at a second network entity, comprising: receiving signaling that indicates an estimated level of interference in a cell supported by the second network entity, the estimated level of interference based at least in part on an adjusted backoff power level at a first network entity; receiving at least one interference report that indicates downlink interference measurements by a UE of a set of UEs in the cell; and transmitting, based at least in part on the estimated level of interference and the at least one interference report, a feedback message that indicates the downlink interference measurements, wherein the downlink interference measurements are based at least in part on the adjusted backoff power level.

Aspect 16: The method of aspect 15, wherein transmitting the feedback message comprises: transmitting, via the feedback message, a difference between a first set of downlink interference measurements obtained by the UE before a backoff power level is adjusted at the first network entity and a second set of downlink interference measurements obtained by the UE after the backoff power level is adjusted at the first network entity.

Aspect 17: The method of any of aspects 15 through 16, wherein transmitting the feedback message comprises: transmitting, via the feedback message, a backoff adaptation command that instructs the first network entity to increase or decrease the adjusted backoff power level based at least in part on the downlink interference measurements from the UE.

Aspect 18: The method of any of aspects 15 through 17, further comprising: determining a quantity of resources used for communications in the cell is less than a threshold quantity; and transmitting a resource status response message that indicates the quantity of resources used for communications in the cell is less than the threshold quantity, wherein receiving the signaling that indicates the estimated level of interference is based at least in part on the resource status response message.

Aspect 19: The method of aspect 18, further comprising: receiving a resource status request message that initiates a backoff adaptation procedure, wherein transmitting the resource status response message is based at least in part on the resource status request message.

Aspect 20: The method of any of aspects 18 through 19, wherein the quantity of resources corresponds to a quantity of physical resource blocks, a quantity of downlink control channel elements, or both; and the quantity of resources comprises resources used within the cell, resources used within a synchronization signal block area, resources used within a network slice, resources used for multiple-input multiple-output communications, resources used for guaranteed bit rate communications, or any combination thereof.

Aspect 21: The method of any of aspects 15 through 20, wherein receiving the signaling comprises: receiving, via the signaling, an indication of a first time at which the adjusted backoff power level and the estimated level of interference associated with the adjusted backoff power level will be applied.

Aspect 22: The method of any of aspects 15 through 21, further comprising: receiving a request to increase a frequency band margin between a first frequency band associated with first communications via a first cell supported by the first network entity and a second frequency band associated with second communications via the cell supported by the second network entity; and scheduling the second communications within the second frequency band at least a threshold margin from the first frequency band based at least in part on the request.

Aspect 23: The method of any of aspects 15 through 22, further comprising: transmitting a control message that indicates a backoff report configuration for reporting changes in the downlink interference measurements at the UE based at least in part on a backoff power level adjustment at the first network entity, the control message indicating a time instance at which the adjusted backoff power level will be applied, wherein; the at least one interference report indicates a difference between a first level of downlink interference measured by the UE prior to the time instance and a second level of downlink interference measured by the UE after the time instance; and transmitting the feedback message is based at least in part on the difference.

Aspect 24: A method for wireless communication at a UE, comprising: measuring a first level of downlink interference at the UE, the downlink interference associated with communications by the UE in a second cell; receiving a control message that indicates a backoff report configuration for reporting changes in the downlink interference at the UE based at least in part on an adjustment of a backoff power level for communications in a first cell; and transmitting, based at least in part on the backoff report configuration, an interference report that indicates a second level of the downlink interference measured at the UE for at least a time period, the second level greater than the first level by at least a threshold, wherein the downlink interference increasing to the second level for the time period is based at least in part on the adjustment of the backoff power level in the first cell.

Aspect 25: The method of aspect 24, further comprising: determining a difference between the second level of the downlink interference and the first level of the downlink interference, wherein the interference report indicates the difference.

Aspect 26: The method of aspect 25, further comprising: comparing the difference with the threshold, wherein the interference report indicates that the difference is greater than the threshold.

Aspect 27: The method of any of aspects 24 through 26, further comprising: receiving, prior to a time instance associated with the adjustment of the backoff power level in the first cell, a first plurality of channel state information reference signals, wherein measuring the first level of the downlink interference is based at least in part on the first plurality of channel state information reference signals; receiving, after the time instance, a second plurality of channel state information reference signals, wherein the control message indicates the time instance; and measuring the second level of the downlink interference based at least in part on the second plurality of channel state information reference signals.

Aspect 28: The method of any of aspects 24 through 27, wherein receiving the control message comprises: receiving, via the control message, an indication of the threshold, the time period, and a time instance at which an adjusted backoff power level in the first cell will be applied.

Aspect 29: An apparatus for wireless communication at a first network entity, comprising a processor; memory coupled with the processor; and instructions stored in the memory and executable by the processor to cause the apparatus to perform a method of any of aspects 1 through 14.

Aspect 30: An apparatus for wireless communication at a first network entity, comprising at least one means for performing a method of any of aspects 1 through 14.

Aspect 31: A non-transitory computer-readable medium storing code for wireless communication at a first network entity, the code comprising instructions executable by a processor to perform a method of any of aspects 1 through 14.

Aspect 32: An apparatus for wireless communication at a second network entity, comprising a processor; memory coupled with the processor; and instructions stored in the memory and executable by the processor to cause the apparatus to perform a method of any of aspects 15 through 23.

Aspect 33: An apparatus for wireless communication at a second network entity, comprising at least one means for performing a method of any of aspects 15 through 23.

Aspect 34: A non-transitory computer-readable medium storing code for wireless communication at a second network entity, the code comprising instructions executable by a processor to perform a method of any of aspects 15 through 23.

Aspect 35: An apparatus for wireless communication at a UE, comprising a processor; memory coupled with the processor; and instructions stored in the memory and executable by the processor to cause the apparatus to perform a method of any of aspects 24 through 28.

Aspect 36: An apparatus for wireless communication at a UE, comprising at least one means for performing a method of any of aspects 24 through 28.

Aspect 37: A non-transitory computer-readable medium storing code for wireless communication at a UE, the code comprising instructions executable by a processor to perform a method of any of aspects 24 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first network entity, comprising:
    adjusting a backoff power level for communications by the first network entity in a first cell;
    transmitting signaling that indicates an estimated level of interference in a second cell supported by a second network entity, the estimated level of interference based at least in part on the adjusted backoff power level for the communications by the first network entity in the first cell; and
    receiving, based at least in part on the estimated level of interference, a feedback message that indicates downlink interference measurements by at least one user equipment (UE) of a set of UEs in the second cell, wherein the downlink interference measurements are based at least in part on the adjusted backoff power level.

2. The method of claim 1, further comprising:
    adapting, based at least in part on the downlink interference measurements indicated via the feedback message, the backoff power level for the communications in the first cell.

3. The method of claim 2, wherein the feedback message comprises a backoff adaptation command, and wherein adapting the backoff power level comprises:
    increasing or decreasing the adjusted backoff power level based at least in part on the backoff adaptation command.

4. The method of claim 2, wherein receiving the feedback message comprises:
    receiving, via the feedback message, a difference between a first set of downlink interference measurements obtained by the at least one UE before the backoff power level is adjusted and a second set of downlink interference measurements by the at least one UE after the backoff power level is adjusted, wherein adapting the backoff power level is based at least in part on the difference being greater than a threshold.

5. The method of claim 2, wherein:
    the downlink interference measurements are associated with a second frequency band, the second frequency band associated with communications via the second cell; and
    the feedback message further indicates additional downlink interference measurements by the at least one UE of the set of UEs in a third frequency band adjacent to the second frequency band, the adapting the backoff power level based at least in part on the additional downlink interference measurements.

6. The method of claim 1, further comprising:
    receiving a resource status response message that initiates a backoff adaptation procedure, wherein adjusting the backoff power level is based at least in part on the received resource status response message.

7. The method of claim 6, wherein the resource status response message indicates that a quantity of resources used for communications in the second cell is less than a threshold quantity.

8. The method of claim 6, further comprising:
    transmitting a resource status request message to initiate the backoff adaptation procedure, wherein receiving the resource status response message is based at least in part on the resource status request message.

9. The method of claim 1, further comprising:
    comparing a first quantity of resources used for the communications in the first cell, a second quantity of resources used for second communications in the second cell, or both with a threshold quantity, wherein adjusting the backoff power level is based at least in part on one or both of the first quantity or the second quantity being less than the threshold quantity.

10. The method of claim 9, wherein:
    the first quantity and the second quantity correspond to a quantity of physical resource blocks, a quantity of downlink control channel elements, or both;
    the first quantity and the second quantity comprise resources associated with a respective cell, resources associated with a synchronization signal block area, resources associated with a network slice, resources associated with multiple-input multiple-output communications, resources associated with guaranteed bit rate communications, or any combination thereof; and
    the threshold quantity is based at least in part on a type of resource usage.

11. The method of claim 1, further comprising:
    determining, based at least in part on an interference estimation procedure, a plurality of estimated levels of interference in the second cell, each estimated level of interference associated with a respective backoff power level of a plurality of backoff power levels at the first network entity; and
    selecting the estimated level of interference from the plurality of estimated levels of interference based at least in part on the adjusted backoff power level.

12. The method of claim 1, wherein transmitting the signaling comprises:
    transmitting, via the signaling, an indication of a first time at which the adjusted backoff power level and the estimated level of interference associated with the adjusted backoff power level will be applied.

13. The method of claim 1, further comprising:
    transmitting, based at least in part on the adjusted backoff power level and the estimated level of interference, a request for the second network entity to increase a frequency band margin between a first frequency band associated with the communications via the first cell and a second frequency band associated with second communications via the second cell.

14. The method of claim 1, wherein:
the first cell is associated with a first frequency band;
the second cell is associated with a second frequency band; and
the estimated level of interference corresponds to an estimated adjacent channel leakage ratio in the second frequency band based at least in part on the communications in the first frequency band.

15. A method for wireless communication at a second network entity, comprising:
receiving signaling that indicates an estimated level of interference in a cell supported by the second network entity, the estimated level of interference based at least in part on an adjusted backoff power level at a first network entity;
receiving at least one interference report that indicates downlink interference measurements by a user equipment (UE) of a set of UEs in the cell; and
transmitting, based at least in part on the estimated level of interference and the at least one interference report, a feedback message that indicates the downlink interference measurements, wherein the downlink interference measurements are based at least in part on the adjusted backoff power level.

16. The method of claim 15, wherein transmitting the feedback message comprises:
transmitting, via the feedback message, a difference between a first set of downlink interference measurements obtained by the UE before a backoff power level is adjusted at the first network entity and a second set of downlink interference measurements obtained by the UE after the backoff power level is adjusted at the first network entity.

17. The method of claim 15, wherein transmitting the feedback message comprises:
transmitting, via the feedback message, a backoff adaptation command that instructs the first network entity to increase or decrease the adjusted backoff power level based at least in part on the downlink interference measurements from the UE.

18. The method of claim 15, further comprising:
determining a quantity of resources used for communications in the cell is less than a threshold quantity; and
transmitting a resource status response message that indicates the quantity of resources used for communications in the cell is less than the threshold quantity, wherein receiving the signaling that indicates the estimated level of interference is based at least in part on the resource status response message.

19. The method of claim 18, further comprising:
receiving a resource status request message that initiates a backoff adaptation procedure, wherein transmitting the resource status response message is based at least in part on the resource status request message.

20. The method of claim 18, wherein:
the quantity of resources corresponds to a quantity of physical resource blocks, a quantity of downlink control channel elements, or both; and
the quantity of resources comprises resources used within the cell, resources used within a synchronization signal block area, resources used within a network slice, resources used for multiple-input multiple-output communications, resources used for guaranteed bit rate communications, or any combination thereof.

21. The method of claim 15, wherein receiving the signaling comprises:
receiving, via the signaling, an indication of a first time at which the adjusted backoff power level and the estimated level of interference associated with the adjusted backoff power level will be applied.

22. The method of claim 15, further comprising:
receiving a request to increase a frequency band margin between a first frequency band associated with first communications via a first cell supported by the first network entity and a second frequency band associated with second communications via the cell supported by the second network entity; and
scheduling the second communications within the second frequency band at least a threshold margin from the first frequency band based at least in part on the request.

23. The method of claim 15, further comprising:
transmitting a control message that indicates a backoff report configuration for reporting changes in the downlink interference measurements at the UE based at least in part on a backoff power level adjustment at the first network entity, the control message indicating a time instance at which the adjusted backoff power level will be applied, wherein:
the at least one interference report indicates a difference between a first level of downlink interference measured by the UE prior to the time instance and a second level of downlink interference measured by the UE after the time instance; and
transmitting the feedback message is based at least in part on the difference.

24. A method for wireless communication at a user equipment (UE), comprising:
measuring a first level of downlink interference at the UE, the downlink interference associated with communications by the UE in a second cell;
receiving a control message that indicates a backoff report configuration for reporting changes in the downlink interference at the UE based at least in part on an adjustment of a backoff power level for communications in a first cell; and
transmitting, based at least in part on the backoff report configuration, an interference report that indicates a second level of the downlink interference measured at the UE for at least a time period, the second level greater than the first level by at least a threshold, wherein the downlink interference increasing to the second level for the time period is based at least in part on the adjustment of the backoff power level in the first cell.

25. The method of claim 24, further comprising:
determining a difference between the second level of the downlink interference and the first level of the downlink interference, wherein the interference report indicates the difference.

26. The method of claim 25, further comprising:
comparing the difference with the threshold, wherein the interference report indicates that the difference is greater than the threshold.

27. The method of claim 24, further comprising:
receiving, prior to a time instance associated with the adjustment of the backoff power level in the first cell, a first plurality of channel state information reference signals, wherein measuring the first level of the downlink interference is based at least in part on the first plurality of channel state information reference signals;

receiving, after the time instance, a second plurality of channel state information reference signals, wherein the control message indicates the time instance; and measuring the second level of the downlink interference based at least in part on the second plurality of channel state information reference signals.

28. The method of claim 24, wherein receiving the control message comprises:

receiving, via the control message, an indication of the threshold, the time period, and a time instance at which an adjusted backoff power level in the first cell will be applied.

29. An apparatus for wireless communication at a first network entity, comprising:

a processor; and a memory coupled with the processor, with instructions stored in the memory, the instructions being executable by the processor to cause the apparatus to:

adjust a backoff power level for communications by the first network entity in a first cell;

transmit signaling that indicates an estimated level of interference in a second cell supported by a second network entity, the estimated level of interference based at least in part on the adjusted backoff power level for the communications by the first network entity in the first cell; and receive, based at least in part on the estimated level of interference, a feedback message that indicates downlink interference measurements by at least one user equipment (UE) of a set of UEs in the second cell, wherein the downlink interference measurements are based at least in part on the adjusted backoff power level.

30. The apparatus of claim 29, wherein the instructions are further executable by the processor to cause the apparatus to:

adapt, based at least in part on the downlink interference measurements indicated via the feedback message, the backoff power level for the communications in the first cell.

* * * * *